US007848994B1

(12) United States Patent  
Andrews et al.

(10) Patent No.: US 7,848,994 B1
(45) Date of Patent: *Dec. 7, 2010

(54) SYSTEM AND METHOD FOR LINKING AND MANAGING LINKED ORDERS IN AN ELECTRONIC TRADING ENVIRONMENT

(75) Inventors: Ryan N. Andrews, Evanston, IL (US); Sagy P. Mitz, Lincolnshire, IL (US); Jyoti Chawla, Aurora, IL (US); David W. Garrison, Arlington Heights, IL (US)

(73) Assignee: Trading Technologies International, Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/415,949

(22) Filed: May 2, 2006

Related U.S. Application Data

(63) Continuation of application No. 10/356,277, filed on Jan. 31, 2003.

(51) Int. Cl.
*G06Q 40/00* (2006.01)
(52) U.S. Cl. .......................................... 705/37
(58) Field of Classification Search .................. 705/37, 705/36
See application file for complete search history.

(56) References Cited

U.S. PATENT DOCUMENTS

| | | | | |
|---|---|---|---|---|
| 5,297,031 A * | 3/1994 | Gutterman et al. | ............. | 705/37 |
| 6,014,643 A * | 1/2000 | Minton | ..................... | 705/36 R |
| 6,377,940 B2 * | 4/2002 | Tilfors et al. | .................. | 705/37 |
| 7,024,387 B1 | 4/2006 | Nieboer et al. | | |
| 7,155,410 B1 * | 12/2006 | Woodmansey et al. | ......... | 705/37 |
| 7,231,363 B1 * | 6/2007 | Hughes et al. | ................ | 705/37 |
| 2001/0042040 A1 * | 11/2001 | Keith | .......................... | 705/37 |
| 2001/0044770 A1 * | 11/2001 | Keith | .......................... | 705/37 |
| 2001/0051909 A1 * | 12/2001 | Keith | .......................... | 705/37 |
| 2002/0046146 A1 | 4/2002 | Otero | | |

(Continued)

FOREIGN PATENT DOCUMENTS

EP 1 067 471 1/2001

(Continued)

OTHER PUBLICATIONS

One Cancels the Other Order (OCO), 1998, http://web.archive.org/web/19981205224116/http://risk.ifci.ch/00012238.*

*Primary Examiner*—James A Kramer
*Assistant Examiner*—Jessica L Lemieux
(74) *Attorney, Agent, or Firm*—McDonnell Boehnen Hulbert & Berghoff LLP

(57) ABSTRACT

A system and method for linking and managing linked orders are described. According to one method, a trader may first link two or more orders into a linked order, and then one or more parameters associated with one of the orders may be dynamically changed based on user inputs or information being received from an exchange. For example, a trader may link any two orders as an order cancel order, and each linked order may be associated with the same or different tradable objects, order quantities, and may be submitted to one or more exchanges. The order quantities may be then dynamically updated based on updates being received from the one or more exchanges and further based on a quantity ratio between the two orders. Further, the linked order may be submitted upon detecting a fill for another order.

22 Claims, 12 Drawing Sheets

U.S. PATENT DOCUMENTS

| | | |
|---|---|---|
| 2002/0046149 A1 | 4/2002 | Otero |
| 2002/0046151 A1 | 4/2002 | Otero |
| 2002/0046156 A1 | 4/2002 | Horn |
| 2002/0049661 A1 | 4/2002 | Otero |
| 2002/0073014 A1* | 6/2002 | Gilbert .................. 705/37 |
| 2002/0091617 A1* | 7/2002 | Keith .................... 705/37 |
| 2002/0107781 A1* | 8/2002 | Neyman et al. .......... 705/37 |
| 2002/0128950 A1 | 9/2002 | Wu |
| 2002/0133454 A1* | 9/2002 | Malitzis et al. .......... 705/37 |
| 2002/0147675 A1* | 10/2002 | Das et al. ............... 705/37 |
| 2002/0188552 A1 | 12/2002 | Kavounas |
| 2002/0194106 A1* | 12/2002 | Kocher ................... 705/37 |
| 2003/0009411 A1* | 1/2003 | Ram et al. ............... 705/37 |
| 2003/0088495 A1 | 5/2003 | Gilbert et al. |
| 2003/0167224 A1* | 9/2003 | Periwal .................. 705/37 |
| 2003/0220865 A1 | 11/2003 | Lutnick |
| 2003/0233308 A1* | 12/2003 | Lundberg et al. ......... 705/37 |

FOREIGN PATENT DOCUMENTS

| | | |
|---|---|---|
| EP | 1104904 A1 | 6/2001 |
| EP | 1217564 A2 | 6/2002 |
| EP | 1217564 A3 | 7/2002 |
| EP | 1235172 A2 | 8/2002 |
| WO | WO95/26005 A1 | 9/1995 |
| WO | WO99/30259 A1 | 6/1999 |
| WO | WO00/51043 A1 | 8/2000 |
| WO | WO00/65510 A1 | 11/2000 |
| WO | WO01/22266 A2 | 3/2001 |
| WO | WO02/33621 A1 | 4/2002 |
| WO | WO02/33623 A1 | 4/2002 |
| WO | WO02/33635 A1 | 4/2002 |
| WO | WO02/33636 A1 | 4/2002 |
| WO | WO02/33637 A1 | 4/2002 |
| WO | WO02/46879 A2 | 6/2002 |
| WO | WO02/46879 A3 | 6/2002 |
| WO | WO02/47006 A1 | 6/2002 |
| WO | WO02/093325 A2 | 11/2002 |

* cited by examiner

SYSTEM AND METHOD FOR LINKING AND MANAGING LINKED ORDERS IN AN ELECTRONIC TRADING ENVIRONMENT

CROSS REFERENCE TO RELATED APPLICATION

This application is a continuation of U.S. patent application Ser. No. 10/356,277 filed Jan. 31, 2003, entitled "System and Method for Linking and Managing Linked Orders in an Electronic Trading Environment," the contents of which are fully incorporated herein by reference.

FIELD OF INVENTION

The present invention is directed towards electronic trading. More specifically, the present invention is directed to tools for trading tradeable objects that can be traded with quantities and/or prices.

BACKGROUND

Trading methods have evolved from a manually intensive process to a technology enabled, electronic platform. With the advent of electronic trading, a user or trader can be in virtually direct contact with the market, from practically anywhere in the world, performing near real-time transactions, and without the need to make personal contact with a broker. Sometimes, electronic trading systems are also convenient for brokers or other market participants on the floor at an exchange for receiving market information.

Electronic trading is generally based on a host exchange, one or more computer networks, and client devices. In general, the host exchange includes one or more centralized computers to form the electronic heart. Its operations typically include order matching, maintaining order books and positions, price information, and managing and updating a database that records such information. The host exchange is also equipped with an external interface that maintains uninterrupted contact to the client devices and possibly other trading-related systems.

Using client devices, market participants or traders link to the host exchange through one or more networks. A network is a group of two or more computers or devices linked together. There are many types of wired and wireless networks such as local area networks and wide area networks. Networks can also be characterized by topology, protocol, and architecture. For example, some market participants may link to the host through a direct connection such as a T1 or ISDN. Some participants may link to the host exchange through direct connections and through other common network components such as high-speed servers, routers, and gateways. The Internet, a well-known collection of networks and gateways, can be used to establish a connection between the client device and the host exchange. There are many different types of networks and combinations of network types known in the art that can link traders to the host exchange.

Regardless of the way in which a connection is established, software running on the client devices allows market participants to log onto one or more exchanges and participate in at least one market. A client device is a computer such as a personal computer, laptop computer, hand-held computer, and so forth that has network access. In general, client devices run software that creates specialized interactive trading screens. Trading screens enable market participants to obtain market quotes, monitor positions, and submit orders to the host.

Generally, when an order is submitted to a host exchange, the host checks the limits of the order, for example price and quantity, and prioritizes the order with other orders of the same price. When buy and sell order prices cross in the market, a trade occurs and information of which is then relayed in some fashion to the client devices. In fact, the host exchange publishes a data feed to the client devices so that the traders can have access to the most current market information.

Market information commonly includes information regarding the inside market and market depth. The inside market is the lowest sell price in the market and the highest buy price in the market at a particular point in time. Market depth refers to quantity available at the inside market and can refer to quantity available at other prices away from the inside market. The quantity available at a given price level is usually provided by the host exchange in aggregate sums. In other words, a host exchange usually provides the total buy or the total sell quantity available in the market at a particular price level in its data feed. The extent of the market depth available to a trader usually depends on the host exchange. For instance, some host exchanges provide market depth for an infinite number of price levels, while some provide only quantities associated with the inside market, and others may provide no market depth at all. Additionally, host exchanges can offer other types of market information such as the last traded price (LTP), the last traded quantity (LTQ), and/or order fill information.

To profit in electronic markets, however, market participants must be able to assimilate large amounts of data, including market information, and react to the received data more quickly than other competing market participants. It is therefore desirable to offer tools that can assist a market participant to make desirable trades at the most favorable prices in a speedy and accurate manner.

BRIEF DESCRIPTION OF THE DRAWINGS

Embodiments of the present invention are described herein with reference to the following drawings, in which.

DETAILED DESCRIPTION OF THE PREFERRED EMBODIMENT(S)

Figure 1:
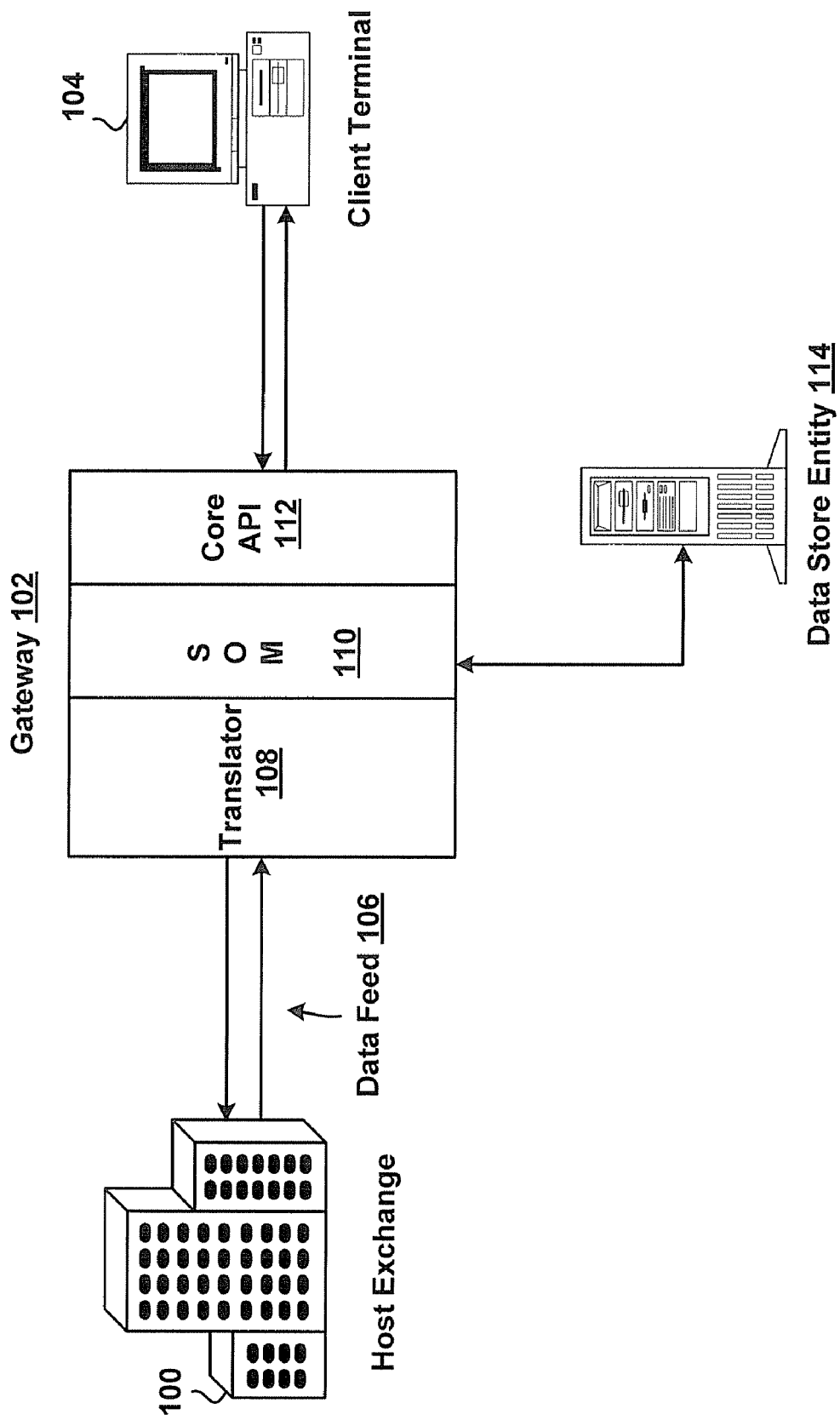
FIG. 1 is an example of a network configuration for a communication system utilized to access one exchange.

It is beneficial to allow a trader to link two or more orders, submit the orders to one or more exchanges and dynamically manage the orders at a centralized module without requiring the trader's interaction. According to one preferred embodiment, a trader may link two or more orders to form an order cancel order ("OCO") pair, and then may submit the two orders to a single or to different exchanges. In such an embodiment, a synthetic order manager associated with a gateway or any other network entity may track any updates related to the submitted orders, such as partial order fills related to one of the orders and then dynamically update, e.g., decrease or cancel, the order quantity associated with the second order based on the received updates and a quantity ratio between the two orders.

For example, the two linked orders may have different quantities and may be associated with two different tradable objects. In such an embodiment, when a partial fill is received for one of the orders, the synthetic order manager may cancel an order quantity associated with the second linked order based on the ratio between the two order and further based on the filled order quantity. For example, if an initial quantity ratio between two orders is 2:1, e.g., the quantities of 20 and 10 are associated with the two orders, and the quantity of 4 gets filled for the first order, the synthetic order manager may decrease the order quantity of the second order by 2.

Further, according to another embodiment, a linked order pair of an OCO associated with the same or different tradable objects and having the same of different order quantities, for example, may be submitted to one or more exchanges upon detecting a predetermined condition associated with another order. In such an embodiment, a buy order may be linked to a sell OCO pair, according to an example embodiment, including a sell stop order and a sell limit order, for example. When the buy order is partially filled, for example, the sell OCO pair, having the order quantities determined based on the partial fill of the buy order, may be submitted to one or more exchanges. More OCO pairs may be subsequently submitted upon detecting additional fills related to the buy order.

Further, according to another embodiment, a trader may link any two or more orders, and any changes applied to one of the linked orders' parameters may be dynamically reflected in other linked orders. For example, if one of the linked orders is deleted, the other linked orders may be dynamically deleted as well. It should be understood that, if more than two orders are linked, a trader may configure which of the linked orders should be deleted upon receiving a user input deleting one of the linked orders. While the present invention is described hereinafter with reference to illustrative embodiments for particular applications, it should be understood that the present invention is not limited thereto. Those having ordinary skill of art will recognize that many additional modifications and embodiments are possible as well.

FIG. 1 shows an example system that may be used to implement a network for processing linked orders in an electronic trading environment in accordance with a preferred embodiment. It should be understood, however, that this and other arrangements described herein are set forth for purposes of example only. As such, those skilled in the art will appreciate that other arrangements and other elements (e.g., machines, interfaces, functions, orders of function, etc.) can be used instead, and some elements may be omitted altogether. Further, as in most telecommunications applications, those skilled in the art will appreciate that many of the elements described herein are functional entities that may be implemented as discrete or distributed components or in conjunction with other components, and in any suitable combination and location.

Still further, many functions described herein as being performed by one or more entities may be carried out by hardware, firmware, and/or software logic. For instance, a processor executing a set of machine language instructions stored in memory may execute various functions. Provided with the present disclosure, those skilled in the art can readily prepare appropriate computer instructions to perform such functions.

Referring back to FIG. 1, the illustrated system includes a host exchange 100, a gateway 102, and a client terminal 104. It should be understood that even though the system illustrates only one client terminal 104 communicating with a single host exchange 100, the client terminal 104 could also communicate with more than one host exchange via the gateway 102 or multiple gateways. Further, it should be understood that the example system is not limited to a single client terminal. In an alternative embodiment, a trading house including a plurality of client terminals may connect to the host exchange 100 via the gateway 102.

The host exchange 100 may be any electronic exchange including the Chicago Board of Trade ("CBOT"), the New York Stock Exchange ("NYSE"), the Chicago Mercantile Exchange ("CME"), Xetra (a German stock exchange), or the European derivatives market ("Eurex"). However, it should be understood that the exchanges could also include any other existing or later developed exchanges. Further, it should be understood that the preferred embodiments are not limited to any particular network architecture or trading application, but rather may be applied with utility in any network that can be used for electronic trading. Furthermore, the invention is not limited to a completely electronic trading environment where orders are sent to an electronic matching engine. For example, the invention could be utilized with an electronic trading application, which sends orders electronically to a terminal where a person (e.g., a floor broker) executes those orders in a traditional open outcry trading floor.

The host exchange 100 connects to the client terminal 104 via the gateway 102. The gateway 102, as is known in the art, may include one or more computers, or software programs, and receives information from the host exchange 100 and sends the information down to the client terminal 104. The host exchange 100 provides market information to the gateway 102 and relays this information, or a portion thereof, collectively called a data feed 106, over a network to market participants at the client terminal 104. A data feed from one exchange may contain different information representing different tradable objects than another data feed from a second exchange. In one embodiment, a data feed may include market information related to all tradable objects being traded at the exchange 100. In such an embodiment, when the client terminal 104 receives such a data feed, a trading application on the client terminal 104 may extract, from the received data feed, information related to one or more tradable objects selected by a user at the client terminal 104. Alternatively, the gateway 102 could be configured to extract the information related to tradable objects selected by a particular user at the client terminal 102. Further, alternatively, the host exchange 100 may have knowledge of tradable object(s) that were selected by a user at the client terminal 104, and may provide to the client terminal 104 only market data related to the selected tradable objects.

As used herein, the term "tradable object" refers simply to anything that can be traded with a quantity and/or price. It includes, but is not limited to, all types of tradable objects such as financial products, which can include, for example, stock options, bonds, futures, currency, and warrants, as well as funds, derivatives, and collections of the foregoing, and all types of commodities, such as grains, energy, and metals. The tradable object may be "real," such as products that are listed by an exchange for trading, or "synthetic," such as a combination of real products that is created by a user. Also, a tradable object could actually be a combination of other tradable objects, such as a class of tradable objects.

The data feed 106 may include information relating to prices and quantities of one or more tradable objects. For example, the data feed 106 could provide data corresponding to quantities at inside market prices and/or data corresponding to quantity at different prices. The inside market is the best bid price ("BBP") and the best ask price ("BAP") for a tradable object. Data feeds from some exchanges may also provide data related to the market depth.

According to one embodiment, each exchange, such as the exchange 100, could be associated with one gateway. When a trader wants to participate in the market at one of the two exchanges, for example, the trader can subscribe to the data feed corresponding to that exchange. If the trader then decides to add the second exchange, the trader may do so at any time. In another embodiment, more than one host exchange may send a data feed to a single gateway. Referring to the example above, each of the two exchanges could send its data to the single gateway. Then, if a trader wants to participate at the two exchanges, the trader may subscribe, at the gateway, to the data feeds corresponding to the selected exchanges. In yet another embodiment, some exchanges may have multiple gateways. For example, the two exchanges may be associated with three gateways each.

The client terminal 104 may include any computing terminal, such as a personal computer, a handheld device, or any other currently existing or later developed computing terminal. The client terminal 104 may connect to the gateway 102 via one or more wireless communication links, wireline communication links, or a combination thereof. In general, according to one embodiment, the client terminal 104 is a computer that allows a trader to participate in the market hosted at the exchange 100, and uses software that creates specialized trading screens on the client terminal 104. Among other functional features, a trading screen being run on the client terminal 104 may enable traders to enter and execute orders, obtain market quotes, and monitor positions. However, it should be understood that, in addition to interactive trading screens, the client terminal 104 may also run automated non-interactive types of trading applications.

A commercially available trading application that allows a user to trade in a system like the one shown in FIG. 1 is X_TRADER® from Trading Technologies International, Inc. of Chicago, Ill. X_TRADER® also provides an electronic trading interface, referred to as MD Trader™, in which working orders and/or bid and ask quantities are displayed in association with a static axis of prices. However, the preferred embodiments are not limited to any particular product that performs translation, storage and display functions.

The gateway 102 can be a computer of any size such as a server, workstation, personal computer, or any network entity having the processing power to perform functions described herein. Also, it should be understood that the functions performed on the gateway 102 can be moved or load-balanced between a plurality of network entities.

As illustrated in FIG. 1, the gateway 102 includes a translator module 108, a synthetic order manager ("SOM") 110, and a core application program interface ("API") 112. It should be understood that in an alternative embodiment, the SOM 110 may be collocated with a client terminal or may be a separate network entity in communication with the gateway 102, for example. The translator module 108 performs protocol conversions between data that is sent to and from the client terminal 104 and the exchange 100. For example, when the gateway 102 receives a data feed 106 from the exchange 100, the translator module 108 may use conversion techniques known in the art to convert the received data to a format compatible with the protocols employed at the client terminal 104. Similarly, when the gateway 102 receives data from the client terminal 104, such as new order data, the translator module 108 converts the received data to a format compatible with the protocols used at the exchange 100.

Among other functions, the core API 112 may hold the current state of the system, perform user authorization, or monitor which client terminals and users are connected to the system. For example, when the gateway 102 receives the data feed 106, the core API 112 may determine if the client terminal 104 is authorized to receive data from the exchange 100, and, upon a successful authorization, the converted data may be sent to the client terminal 104.

Further, as mentioned in the preceding paragraph, the gateway 102 includes the SOM 110 that is configured to process linked order sets, where each order set may include two or more linked orders described further below. According to one embodiment, a trader may link any two or more orders, and the SOM 110 may process and control order parameters based on any user configurations. The linked orders may include conditional orders, e.g., orders that are submitted to an exchange upon detecting one or more conditions triggering the submission of one or more linked orders to the exchange. For example, a triggering condition may include any market-related data condition, or any data related to one or more orders forming a linked order set, such as fill update data or a detection of deletion of one or more orders forming the linked order set. However, it should be understood that the present invention is not limited to such linked orders, and any two orders of the same or different quantities, tradable objects, order types, and any two orders submitted to the same or different exchanges, may be linked to form a linked order set.

According to one embodiment, the SOM 110 may be implemented using one or more servers that are arranged to support processing of linked order sets and monitoring triggers associated with the orders. Generally, a server is a computer or program that responds to commands from a client terminal. FIG. 1 illustrates the SOM 110 as part of the gateway 110. However, it should be understood that the SOM 110 may be implemented using one or more network servers in communication with one or more gateways, such as the gateway 112. The SOM 110 also communicates with the data store entity 114 that provides a central storage means for data related to linked orders. It should be understood that the data store entity 114 does not have to be a separate entity and, in an alternative embodiment, the data store entity 114 may be collocated with the SOM 110. The data store entity 114 may include a database, a network server, or any other network entity capable of storing data. In addition to storing order status information, the data store entity 114 stores general information related to linked orders. For instance, each linked order record may define which orders have been linked, conditions triggering submission of one or more linked orders to an exchange, as well as rules for processing orders.

According to one embodiment, and as mentioned in the preceding paragraphs, conditions related to linked orders may include market data related event conditions or any other user configurable events that may trigger submission of one or more linked orders to the exchange. Further, the SOM 110 may dynamically submit orders to an exchange, and prices of the orders may be based upon the position of the market. In one embodiment, a trader may specify a tick value away from the inside market based on which an order may be submitted to the exchange. For example, a market maker may decide to configure a buy and sell order to be sent to the exchange at minus/plus two ticks from the inside market. In such an embodiment, every time a fill associated with one of the orders occurs, the SOM 110 may place another order to the exchange based on the predefined tick value so that the trader always has a working buy and a sell order on the market.

Further, the data store entity 114 may include records associated with the current status of each order. For example, when the gateway 102 receives an order request associated with a linked order, order-related data, such as an order identifier for each linked order and any other order related data such as an exchange identifier associated with an exchange to which each order should be sent, may be stored in the data store entity 114. For example, upon receiving a linked order set, a new order record may be created in the data store entity 114 for the received linked order set. The record may then be tagged with a predetermined identifier indicating the status of each order that has been linked. For example, if one of the linked orders is to be activated, e.g., sent to an exchange upon detecting a predetermined condition, the order may be first tagged with a pending identifier. Then, for example, once the predetermined condition is detected, and the order is submitted to an exchange, the pending order identifier may be updated to an active identifier.

According to a preferred embodiment, the data store entity 114 may serve as a central locking location so that, for instance, when two or more SOMs receive data related to the same order, such as an order update related to fill information, only the SOM that accesses the data store entity 114 first will be able to update the record related to the order, thus, effectively "locking" the same information from being updated more than once. It should be understood that different locking means could be used. For instance, when the first SOM updates a specific record in the data store entity 114 based on the update received from the exchange, for example, the first SOM could insert into the record a predetermined identifier indicating that the record has been already updated. Such an embodiment is especially useful when two traders in the same group are logged on two different gateways, and both gateways receive updates, such as fill updates, for the same order. When the updates are received on the two SOMs, the SOMs will attempt to update the same order record on the data store entity 114. However, using the locking mechanism described above, when the first SOM accesses the record first, it will effectively lock the record preventing the second SOM from updating the same information more than once.

Further, it should be understood that, upon starting-up the gateway 102, and upon detecting that a trader has logged into the gateway 102, the SOM 110 may query the data store entity 114 for all synthetic orders associated with that trader. Based on that information, the SOM 110 may update its internal list of triggers to be monitored for the synthetic orders associated with the trader. Additionally, it should be understood that when the SOM 110 loses its connectivity to the data store entity 114, the SOM 110 may put all synthetic orders on hold until the connectivity is restored. When an order is put on hold, the order may effectively be deleted from the exchange, and the information related to the order may be stored in an order book either on a client terminal or a gateway. In such an embodiment, when a trader reactivates the order that has been put on hold by selecting a predetermined user selection input, for example, the order information may be retrieved from the order book, and the order may be resubmitted to the exchange.

Figure 2:
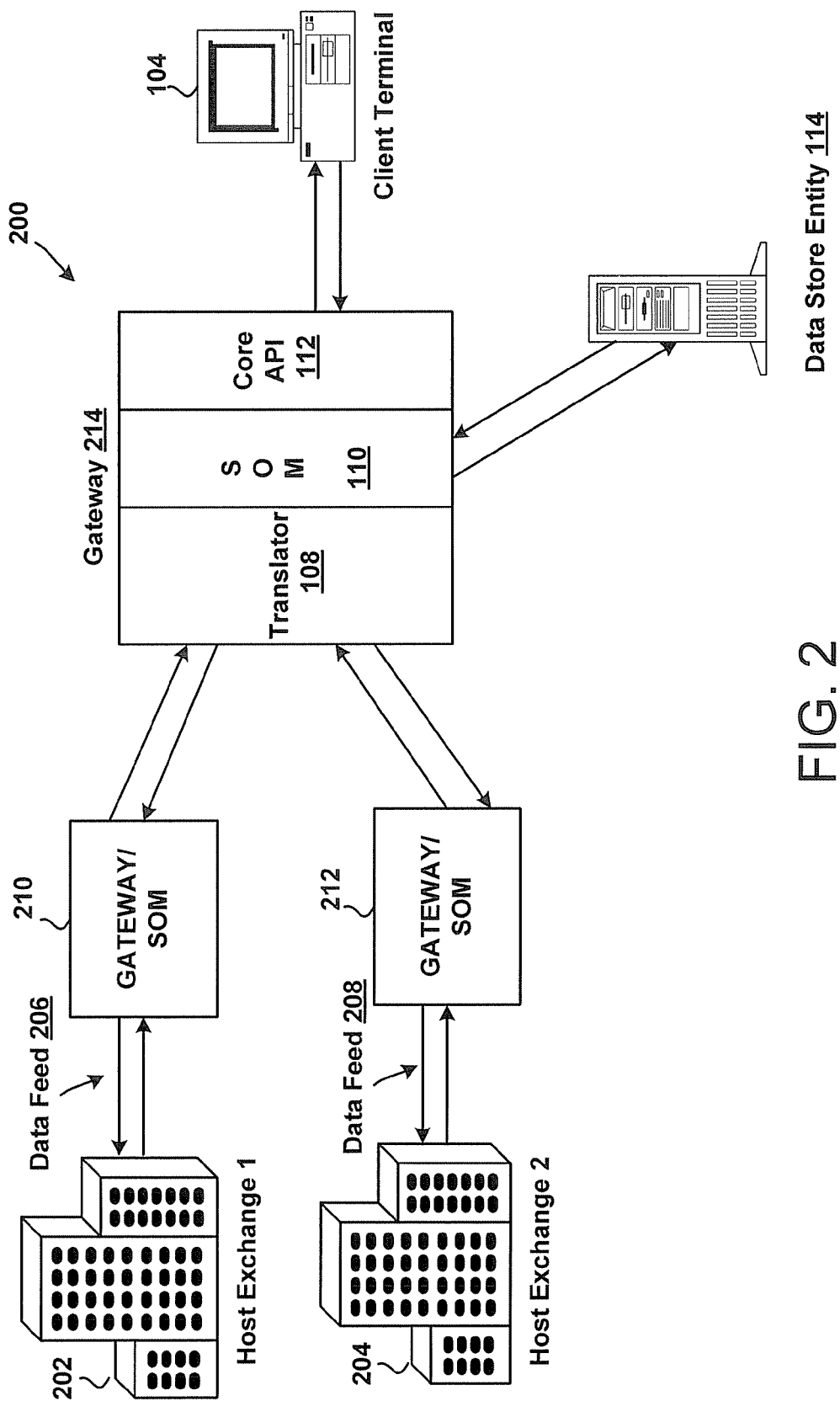
FIG. 2 is an example of a network configuration for a communication system utilized to access two or more exchanges.

FIG. 2 is a block diagram illustrating an example system 200 that may be used to implement a network for processing linked orders in an electronic trading environment, in which linked orders are sent to two different exchanges. The illustrated system 200 illustrates the client terminal 104, a gateway 214 including the SOM 110 communicating with the data store entity 114, the core API 112, and the translator 108 that have been described in reference to FIG. 2. The gateway 214 may further communicate with two other gateways 210 and 212 enabling a trader to submit two or more orders being linked as an linked order set to two different exchanges 202 and 204 providing data feeds 206 and 208, respectively. It should be understood that the embodiments described hereinafter and related to synthetic orders and linked orders may be implemented using any system and are not limited to two exchanges. For example, and as will be described in greater detail below, a trader may link three orders that may be submitted to three different exchanges. In such an embodiment, when a fill associated with a first order is detected, two other linked orders, having order quantities equal to the detected fill, may be submitted as an OCO order pair to two different exchanges.

Further, as illustrated in FIG. 2, each gateway 210 or 212 may be associated with another SOM in communication with the SOM 110 on the gateway 214. In such an embodiment, the functionality of the SOM may be distributed between the SOM 110, and the SOMs located on the gateways 210 and 212.

Figure 3:
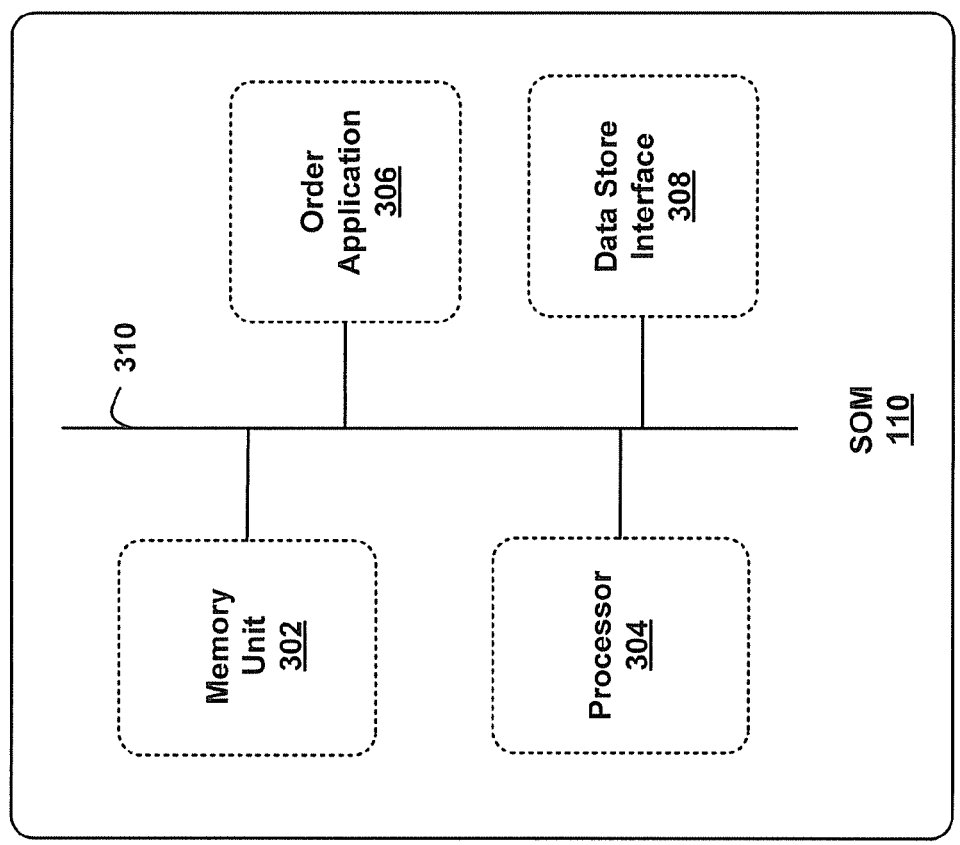
FIG. 3 is a simplified block diagram of a synthetic order manager for processing synthetic orders according to one example embodiment.

FIG. 3 is a simplified block diagram of an example SOM 110 that may be used for processing and managing linked orders according to one example embodiment. The SOM includes a memory unit 302, a processor 304, an order application 306, a data store interface 308, and a bus 310 that links all components of the SOM 110. The order application 306 allows users to link any two or more orders and to manage such orders.

The memory unit 302 may include any type of memory means including a random access memory, read only memory, or another appropriate storage medium. The processor 304 may include any existing or later developed processing unit. It should be understood that the application programs of the order application 306 can be stored in the memory unit 302. The data store interface 308 provides means for communicating data between the SOM 110 and the data store entity 114.

According to one embodiment, when the gateway 102 receives an order, the synthetic order application 306 may determine if the order is a synthetic order. According to one embodiment, the synthetic order application 306 may determine if an incoming order is a synthetic order based on a predetermined identifier attached to the order, or based on order parameters, such as order triggers specified in the order. The synthetic order application 306 may make that determination based on data available in the memory unit 302 or by querying the data store entity 114. If the incoming order is a synthetic order, the synthetic order application 114 may then determine if the exchange to which the order should be sent supports this type of order. Once again, the synthetic order application 306 may make that determination based on data available at the data store entity 114 or based on data in its own memory unit. If the exchange supports the specified type of synthetic order, the SOM 110 may forward the order request to the translator 108, which, responsively, may translate the order to a protocol format used at the exchange, and the gateway 102 may forward the order to the exchange.

However, if the synthetic order application 306 determines that the exchange does not support the requested synthetic order, the gateway 102 does not forward the order to the exchange. Instead, the synthetic order application 306 may determine triggering events that are associated with the order. In one embodiment, the gateway 102 may offer a number of standard synthetic orders having one or more preset triggering events. A standard synthetic order is a synthetic order associated with one or more preset triggering events, where a trader may specify any desirable values for the preset triggering events. For instance, if a triggering event is a price trigger, a trader may enter a desirable price level at which the order should be triggered, and then submitted to an exchange. Alternatively, instead of providing standard synthetic orders having preset triggering events, the gateway 102 may provide a number of triggering events that are supported by the SOM 110, and a trader may use the provided triggering events to create his own synthetic order, i.e., a user configurable synthetic order. It should be understood that, in one embodiment, a window interface or any other interface may be provided to a trader, via which the trader may select a predetermined standard synthetic order, or create his own synthetic order based on the triggering events that are supported at the gateway 104.

Once the synthetic order application 306 determines the triggering events, the synthetic order application 306 may start monitoring the triggering events associated with the order. For example, if a triggering event is based on a price of a tradable object, the synthetic order application 306 may start monitoring price updates associated with a predetermined tradable object until a trigger price specified by a user is reached, thus triggering submission of the order to the exchange, the embodiments of which will be described in greater detail in reference to subsequent figures.

When the synthetic order application 306 detects one or more triggers associated with a synthetic order, the gateway 102 may submit the order to the exchange 100. However, before the gateway 102 submits the order to the exchange 100, the synthetic order application 306 may append to the order a synthetic order indicator. Preferably, the synthetic order indicator is appended to a portion of the original order that is not modified by the exchange. In such an embodiment, any synthetic order related updates will include the identifier that has been appended by the application 306 to the original order data. In such an embodiment, when the SOM 110 receives order updates from the exchange 100, the SOM 110 may determine if the received update includes a synthetic order indicator and thus whether the update is related to a synthetic order. If an update includes a synthetic order indicator, such an update may be forwarded to the synthetic order application 306 for processing. The processing of the updates, among other functions, may include updating of a status of a synthetic order specified in the update. Thus, such an embodiment allows for saving time on data reads to and from the data store entity 114 as well as processing of non-synthetic orders.

Figure 4A:
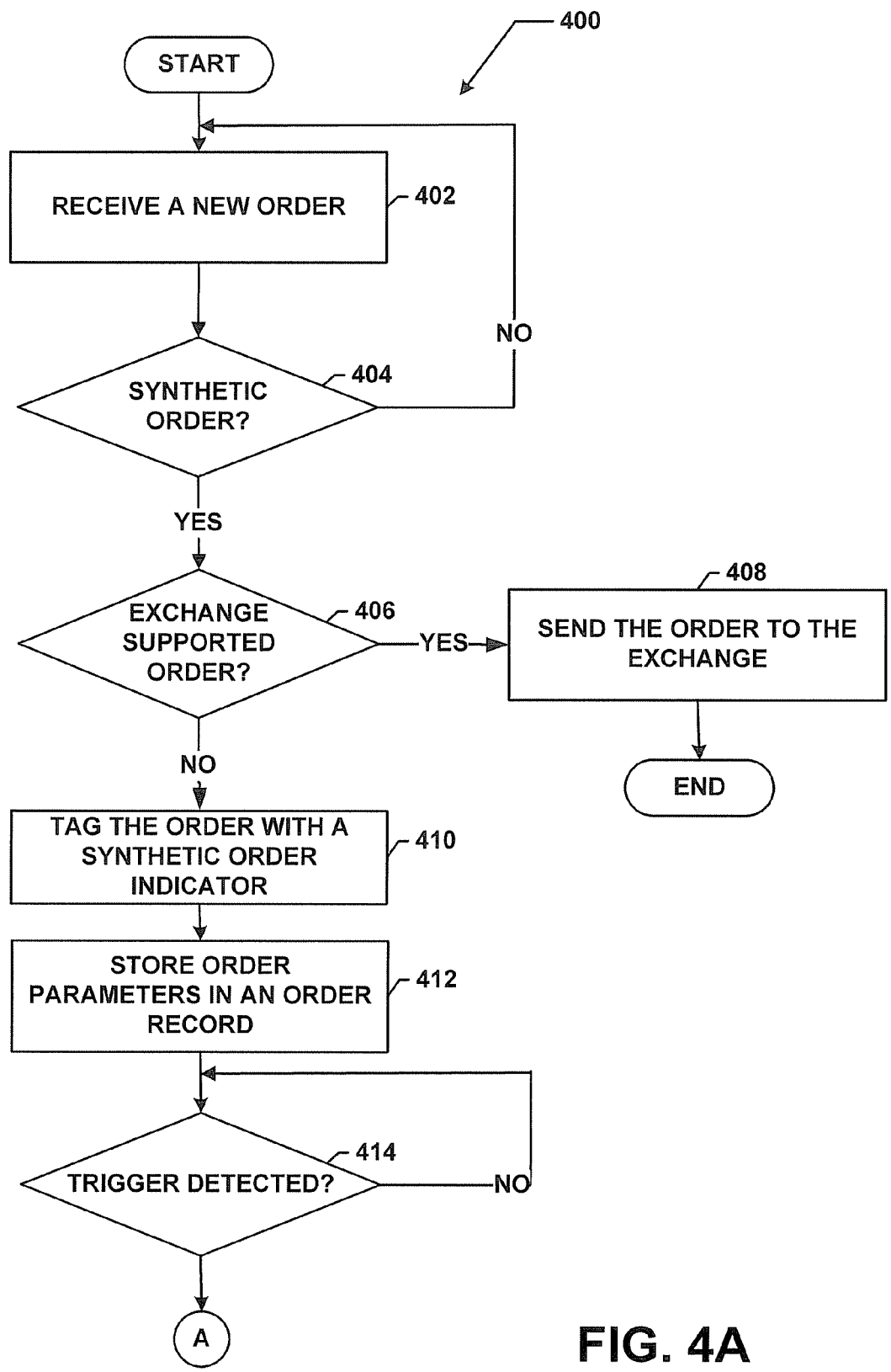
FIGS. 4A and 4B are a flow chart illustrating a method for processing synthetic orders according to one example embodiment.
Figure 4B:
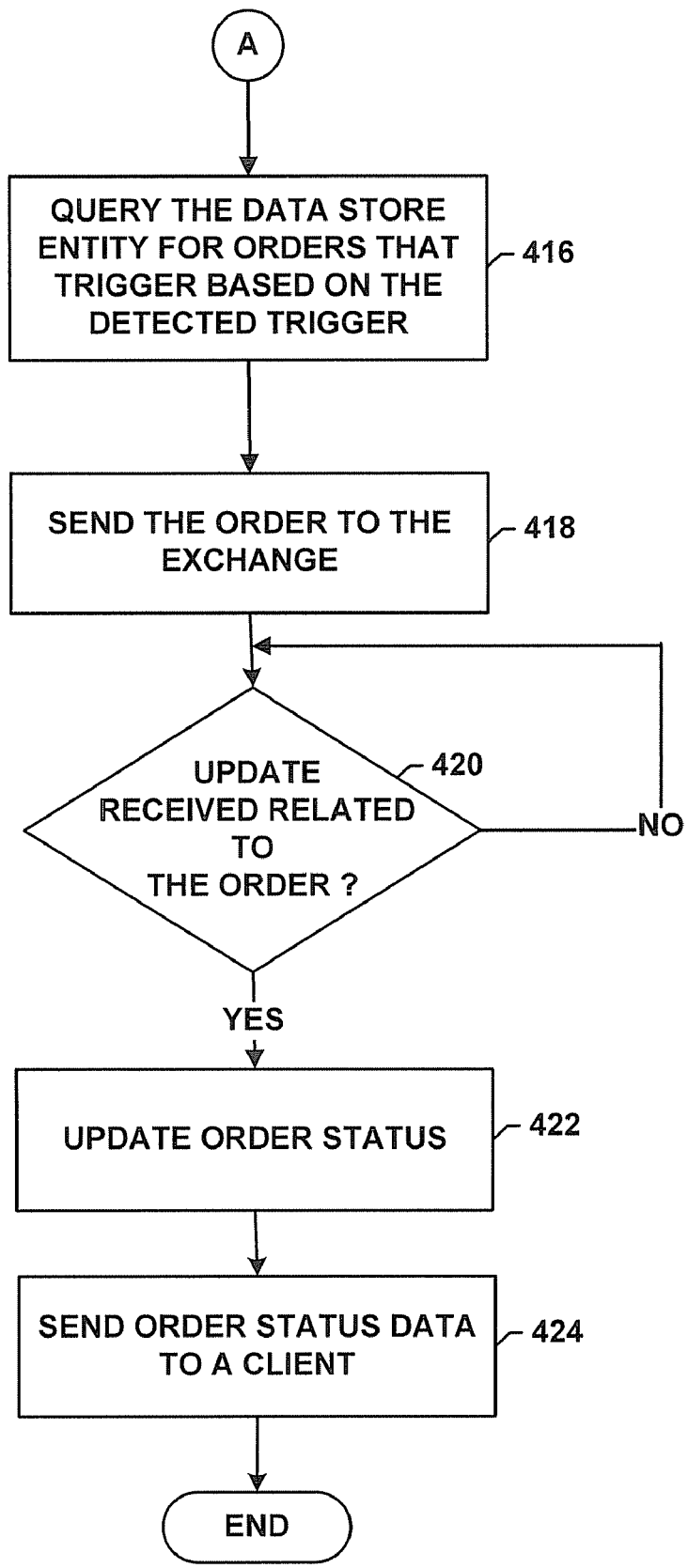

FIGS. 4A and 4B are a flow chart illustrating a method 400 for processing synthetic orders according to one example embodiment. The method 400 will be described in relation to network entities described in FIG. 1. However, it should be understood that the method 400 is not limited to the network architecture or network, entities illustrated in FIG. 1.

At step 402, the gateway 102 receives an order request from the client terminal 104. When the core API 112 receives the order request, the core API 112 may perform authorization of a trader associated with the request. For example, among other authorization procedures, the core API 112 may determine if a trader is authorized to receive market data, such as price updates, associated with a tradable object specified in the order request. In one embodiment, the authorization may be performed based on the trader's identifier or a group identifier specified in the order request. However, it should be understood that different authorization methods could also be used as well.

Upon successful authorization, the core API 112 may send the order request to the SOM 110, which, at step 404, determines if the received order request is associated with a synthetic order. It should be understood that the determination whether the order is a synthetic order may be performed in many ways. In one embodiment, the order request may include an identifier that indicates whether the order is a synthetic order. The SOM 110 may then determine if the identifier specified in the request matches any identifiers associated with synthetic orders provided by the gateway 102. For example, the synthetic order identifiers may be stored on the SOM 110, in the SOM's memory unit 302. Alternatively, the data store entity 114 may store the identifiers, and the SOM 110 may download the identifiers from the data store entity 114 upon each start up. Alternatively, the SOM 110 may determine if the order is a synthetic order request based on order parameters, other than the identifier defining the order as a synthetic order. For instance, if the order request includes a user configurable synthetic order, the order request may specify one or more triggering events and values for the events. In such an embodiment, the SOM 110 may determine if the received order request includes one or more triggering events associated with the synthetic orders. It should be understood that different methods for determining whether an order request is associated with a synthetic order could also be used. If the received order is not a synthetic order, the method continues at step 402, when the SOM 110 may receive a new order at step 402 and then determine if the order is the synthetic order at step 404.

At step 406, the SOM 110 determines whether the type of the synthetic order specified in the request is handled by an exchange associated with the request. According to one embodiment, to make that determination, the SOM 110 may query the data store unit 114. As mentioned in the preceding paragraphs, the data store unit 114 may store records including information related to types of orders that are handled at each exchange. Alternatively, a record associated with each exchange may specify types of triggers that each exchange is capable of processing. In such an embodiment, the SOM 110 may query the data store entity 114 to determine if the exchange to which the order should be sent supports the triggers associated with the synthetic order specified in the request.

If the exchange supports the requested synthetic order, at step 408, the gateway 102 sends the order to the exchange. It should be understood that before sending the order to the exchange, the SOM 110 forwards the order to the translator 108 that may translate the order parameters to a protocol format used at the exchange. However, if the exchange does not support the requested synthetic order, at step 410, the SOM 110 may tag the order with a synthetic order indicator so that the gateway 102 may easily distinguish which order updates that are received from the exchange correspond to the synthetic orders and require synthetic order processing. To ensure that the exchange returns a synthetic order indicator with any information related to the synthetic order, the synthetic order indicator may be appended to one of the order fields that are returned from the exchange with every response or fill update related to that order. For instance, a synthetic order indicator may be appended to a site key field of an order. However, different embodiments are possible as well. Thus, when the gateway 102 receives an order update including a synthetic order indicator, the gateway 102 may quickly determine that the update corresponds to one of the submitted synthetic orders. Similarly, if the update does not include a synthetic order indicator, the gateway 102 does not attempt to process updates related to standard orders as updates related to synthetic orders, thus, saving time on data processing and reads from and reads to the data store entity 114.

When the SOM 110 tags the order with the synthetic order identifier, at step 412, the SOM 110 stores the order in the SOM's memory unit and the data store entity 114. As mentioned in the paragraphs above, the data store entity 114 may first create a record for the order and then mark the record with an order status identifier. Among many possible identifiers, the data store entity 114 may mark the order record with a pending identifier, an active identifier, a pending trigger identifier, or a working order identifier, for instance. In one embodiment, if the SOM 110 determines that one of order triggering events is a price level triggering event, the SOM 110 may first determine if a trader is subscribed to a price feed associated with a tradable object in the synthetic order. If the SOM 110 determines that the trader does not receive the price feed associated with the tradable object, the order may be marked with a pending identifier, and the process of subscribing to a desired price feed may be initiated. Accordingly, when the process of subscribing to the price feed is successfully completed, the order identifier may be updated to an active order identifier.

Additionally, when the order is activated, the order may also be marked with a pending trigger identifier indicating that the SOM 110 may start monitoring triggering events associated with the order. Further, when the order is submitted to the exchange, the SOM 110 may mark the order with the working order identifier. However, it should be understood that different, more, fewer, or equivalent identifiers could be used instead. Further, it should be understood that the example embodiments are not limited to determining if the trader's client terminal receives a price feed associated with a tradable object specified in the synthetic order request. In other embodiments, a determination of other parameters or conditions may be made based on a triggering event associated with a synthetic order or based on other settings.

Upon marking the order with an active order identifier, the SOM 110 may start monitoring one or more triggering events associated with the synthetic order. According to an example embodiment, the SOM 110 may create a triggering event record including triggering events for all synthetic orders marked with the pending trigger identifier. In such an embodiment, every time a new order is marked with a pending trigger identifier, the triggering event associated with that order may be added to the triggering event record. Such records may then be stored in the memory unit on the SOM 110. For example, if one or more synthetic orders trigger based on a plurality of price levels, the triggering event record may include a general trigger related to monitoring one or more price feeds associated with one or more synthetic orders, and a plurality of triggers within the general trigger identifying specific price levels to be monitored. It should be understood that different implementations are possible as well.

Referring to FIG. 4B, at step 414, the SOM 110 determines if one or more triggers associated with the synthetic order have been detected. For example, it should be understood that a synthetic order may be triggered based on one triggering event or based on a number of triggering events. In one embodiment, a user may configure a synthetic order to trigger based on a multilevel trigger, i.e., a trigger including a plurality of sub-triggers that may be checked in a predetermined user-configurable order. For example, a first trigger may include a predetermined price range that, when satisfied, may activate the process of monitoring a second trigger such as a fill event on a different order, or vice versa. It should be understood that many different embodiments are possible as well.

If the SOM 110 detects one or more triggers associated with the synthetic order, at step 416, the SOM 110 may query the data store entity 114 for any orders of traders logged onto the gateway 102 that should be activated based on the detected trigger. It should be understood that the triggered action may involve submitting of the order to the exchange or, alternatively, may invoke monitoring of the next trigger associated with one or more orders. If one or more orders exist that should be submitted to the exchange when a specific trigger is detected, the SOM 110 may access such order records on the data store entity 114. As mentioned in the preceding paragraph, more than one SOM may be involved in processing of the same set of orders. In such an embodiment, if the SOM 110 attempts to access an order record, and the record is locked, the process terminates, since another SOM has already accessed the record and is working on submitting the order to the exchange.

If the SOM 110 is successful in accessing the order record, at step 418, the SOM 110 may submit the order to the translator 108 that may subsequently translate the order to a protocol format used at the exchange. Then, the gateway 102 may start monitoring updates from the exchange 100. At step 420, the SOM 110 determines if any updates related to the submitted synthetic order have been received from the exchange 100. As mentioned earlier, the SOM 110 may quickly determine if an update is related to a synthetic order based on whether the update includes a synthetic order indicator. Thus, if an order update includes a synthetic order indicator, the SOM 110 may determine that the update is related to the synthetic order. If such a determination is made, the SOM 110 may then match the synthetic order indicator with a specific synthetic order that has been submitted to the exchange.

If the order update relates to the submitted synthetic order, at step 422, the SOM 110 may update the status of the order based on the information provided in the update. For instance, the update may indicate that the order has been received at the exchange or that the order has been filled. According to the preferred embodiment in which the data store entity 114 is a central storage entity for synthetic orders, the SOM 110 may access the data store entity 114 and update the status of the order in the record corresponding to the order. It should be understood, and as will be described in reference to the subsequent figure, if more than one gateway receives the order update, the SOM 110 may first determine if the record associated with the order is unlocked, i.e., whether another SOM has not already accessed the data store entity 114 and updated the order record. If the record is unlocked, the SOM 110 may access the record and update the order status based on the update information specified in the received update. For example, if the update specifies that the order quantity has been filled, the SOM 110 may update the working order identifier to a filled order identifier. It should be understood that if the order is filled by the exchange, the SOM 110 may remove the triggering event associated with the order from its list of triggering events. Finally, at step 424, the SOM 110 sends the order status data to the client terminal, and the method 400 terminates.

According to a preferred embodiment, the data store entity 114 may function as a centralized network entity and may track status of synthetic orders that are serviced at a plurality of gateways. The centralized functionality may be especially useful in a system in which two or more traders in the same group are logged onto two or more gateways, and SOMs associated with the gateways may monitor triggering events, submit orders based on the occurrence of specific triggers for the same set of orders, or update status of each such order. To prevent more than one gateway from submitting an order to the exchange when one or more triggers are detected for the order by more than one gateway, each SOM may be configured to access the data store entity 114 and verify the status of the order before taking any action on the order. According to the preferred embodiment, the data store entity 114 provides a locking mechanism that prevents more than one SOM from taking the same type of action on a specific order. For instance, when more than one SOM monitors the triggering events for the same synthetic order, it is important that only one of the SOMs will be able to send the order to the exchange upon detecting one or more triggering events associated with the order.

Figure 5A:
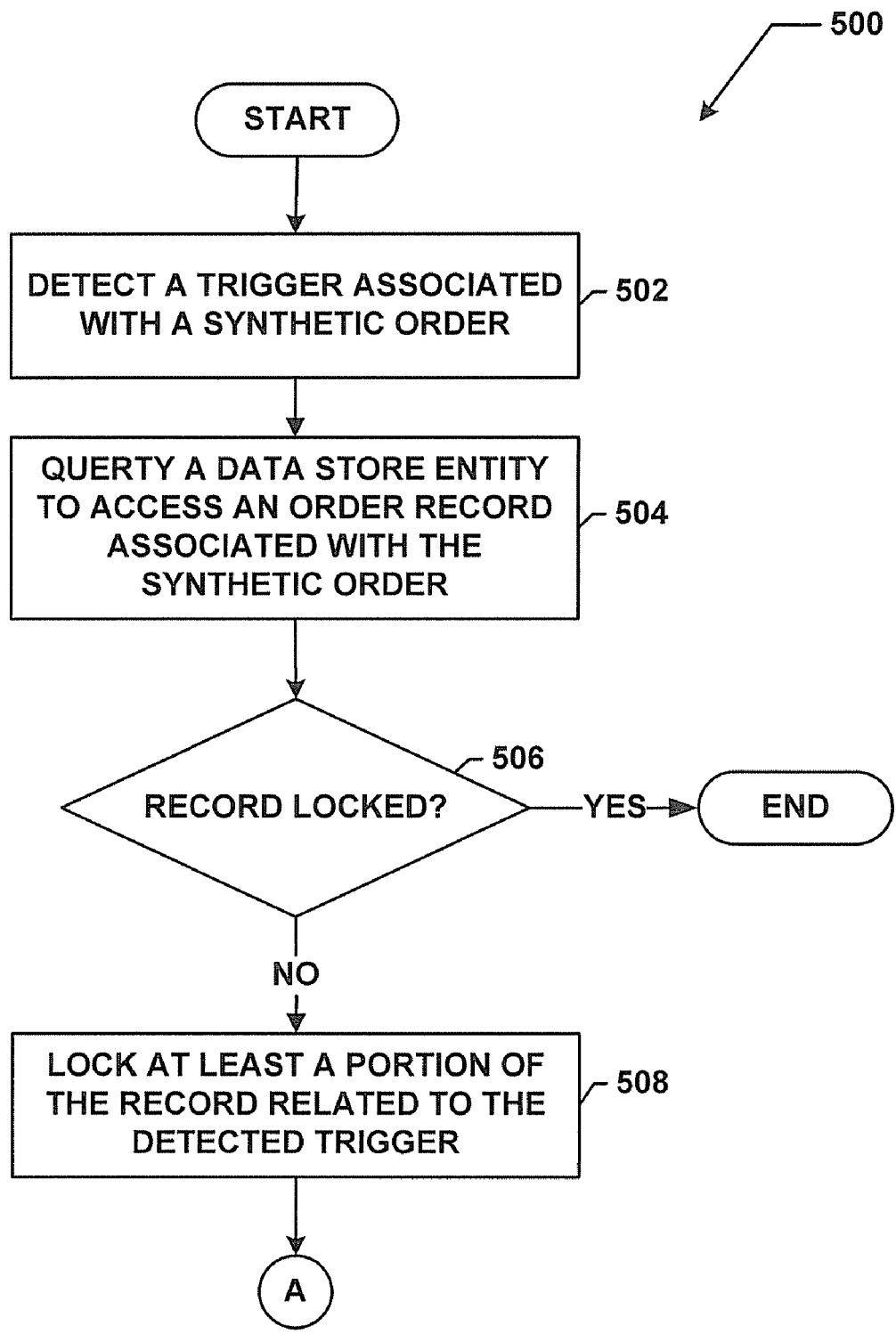
FIGS. 5A and 5B are a flow chart illustrating a method for updating and locking records associated with synthetic orders on a data store entity upon detecting a trigger associated with a synthetic order according to one example embodiment.
Figure 5B:
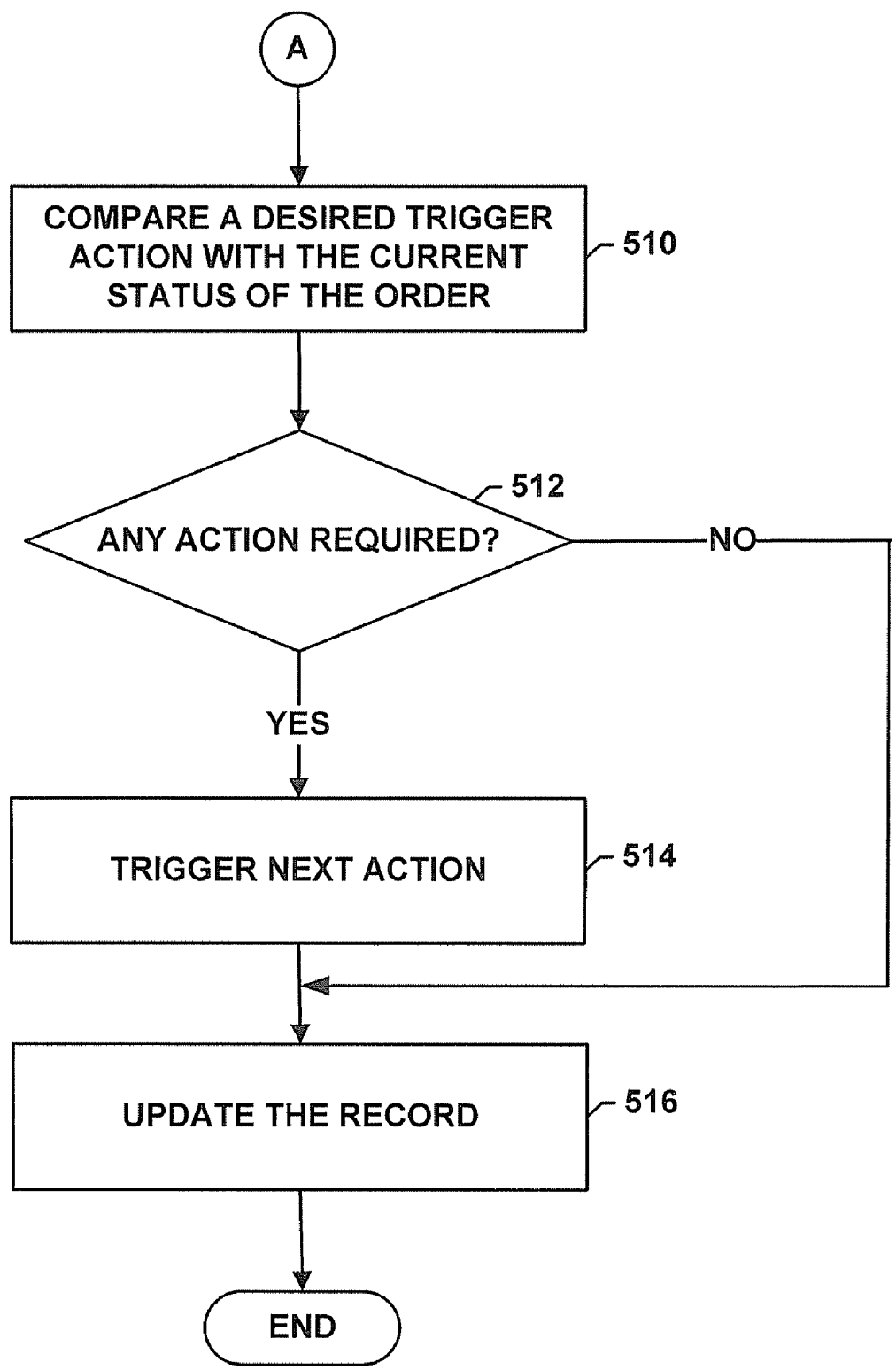

FIGS. 5A and 5B are a flow chart illustrating a method 500 for updating and locking records associated with synthetic orders on the data store entity 114. According to the method 500, more than one gateway and associated SOMs may receive updates and submit orders related to the same set of synthetic orders. More specifically, the method 500 relates to monitoring triggering events associated with a predetermined set of synthetic orders on multiple SOMs.

At step 502, a plurality of SOMs detects one or more triggers associated with a synthetic order. For instance, the one or more triggers, when detected, may trigger submission of an order to the exchange. At step 504, the plurality of SOMs query the data store entity 114 to access an order record of the synthetic order. It should be understood that each SOM may detect one or more triggers at slightly different times, thus, affecting the time when each SOM queries the data store entity 114. According to a preferred embodiment, the first SOM which accesses the order record may lock the order record or a portion thereof upon accessing the record, thus, effectively preventing other SOMs that access the data store entity 114 at a later time from updating the record based on the same trigger, or taking any actions that should be initiated upon detecting the trigger.

When each of the plurality of SOMs accesses the data store entity 114, each SOM determines if the order record or a portion of the order record associated with the detected triggering event has been locked. As mentioned earlier, an order record or a portion thereof may be locked via a number of means, and one of them may involve tagging the record with one or more identifiers preventing another SOM from accessing or modifying a certain portion of the record when another SOM has already done so. Thus, if the SOM determines that the order record or a relevant portion thereof has been locked, the method 400 terminates. However, if the SOM determines that there is no lock on the record, the SOM may take a certain action based on the detected trigger.

Thus, at step 508, the SOM may lock at least a portion or the entire order record preventing another SOM from accessing or updating the record. Referring to FIG. 5B, at step 510, the SOM may compare a desired trigger action with the current status of the order. For instance, if a trigger action requires the SOM to submit the order to the exchange once the one or more triggers have been detected, the SOM may first determine if the order is not expired before submitting the order to the exchange. In one embodiment, the order expiration date may be based on a predetermined user-configurable date such as a contract expiration date, or the end of a predetermined trading session, for instance. Alternatively, a user may configure specific dates defining when the synthetic order can be submitted.

At step 512, the SOM determines if any action is required based on the detected trigger. Among many possible actions, the one or more triggers may activate submission of the associated synthetic order to the exchange or activation of a process involving monitoring of another set of triggers, such as in a multi-trigger synthetic order case, for instance. If no action is required based on the detected trigger, the method proceeds to step 516. However, if the triggers invoke a predetermined action, such as submission of the order to the exchange, at step 514, the SOM triggers such an action, and the order is submitted to the exchange. Next, upon completion of the action, the SOM updates the record that the action has been completed. For example, the SOM may update the order status identifier to a working order identifier indicating that the order has been successfully submitted to the exchange, and the method 400 terminates.

Figure 6A:
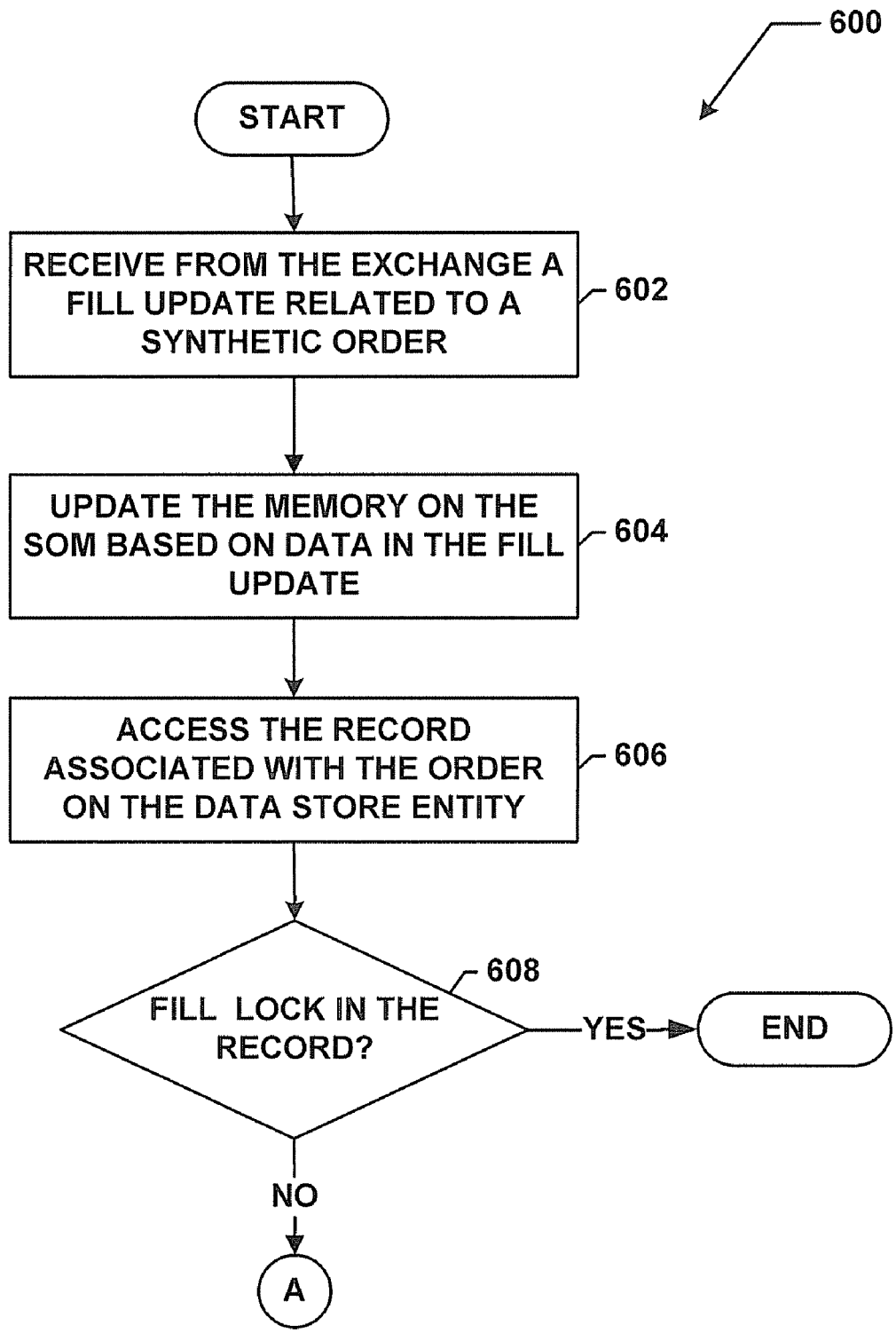
FIGS. 6A and 6B are a flow chart illustrating a method for updating synthetic orders records based on updates provided by an exchange according to one example embodiment.
Figure 6B:
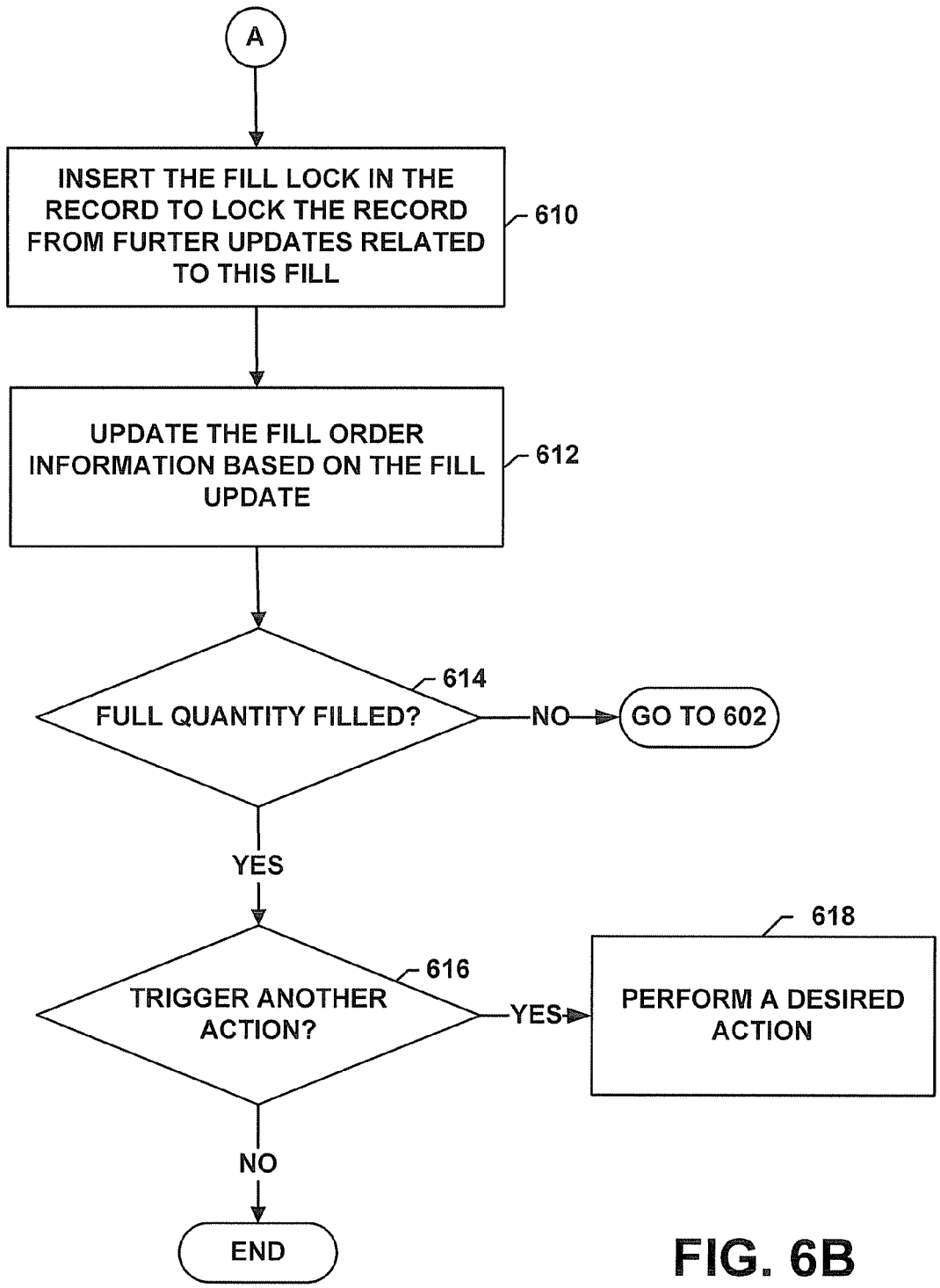

FIGS. 6A and 6B are a flow chart illustrating a method 600 for updating synthetic order records based on updates provided by the exchange. The method 600 is described in reference to fill updates being received from the exchange. However, it should be understood that the fill updates are used only as an example, and any updates could be processed according to the method 600.

At step 602, a gateway receives from an exchange a fill update related to a synthetic order. According to one embodiment, a SOM on the gateway may determine that the update is related to a synthetic order based on a synthetic order indicator included in the update, for instance. At step 604, the SOM updates its memory records associated with the synthetic order based on the fill information specified in the received fill update. Next, at step 606, the SOM accesses a record associated with a synthetic order on the data store entity, and, at step 608, the SOM determines if a fill lock has been applied to the record indicating that another SOM has already updated the record based on the fill update. Therefore, if the record data related to the received fill information has been already updated, the method 600 terminates. Otherwise, at step 610, the SOM inserts the fill lock in the synthetic order record so that no other SOM can access the record to update the same fill information. Next, at step 612, the SOM updates the fill order information in the synthetic order record based on the fill information provided in the received update.

At step 614, the SOM may determine if a full order quantity has been filled. If the quantity has been filled only partially, the method 600 may continue at step 602. However, if the order quantity has been fully filled, at step 616, the SOM may determine if the synthetic order is a multi-trigger synthetic order and if another action should be triggered based on the received fill update. If no such next level trigger exists, the method 500 terminates. If the SOM determines that the fill of the full quantity triggers another action, at step 518, the SOM may initiate performing such an action. For example, among many possible embodiments, the fill of the full quantity may trigger a process of monitoring another trigger associated with the same or a different synthetic order or submission of another order to the exchange.

Further, it should be understood that in addition to receiving updates from the exchange, the SOM 110 may receive synthetic order updates from a client terminal. For example, if a predetermined synthetic order has expired, a trader may wish to resubmit such an order. Alternatively, a trader may wish to delete, replace an existing synthetic order with a new order, or change one or more order parameters such as an order quantity or a price level to be used as a triggering event, for instance. When the SOM 110 receives such an update, the SOM 110 may first update the received information in its memory unit and then access the data store entity 114 to update the order record corresponding to the order.

Additionally, a trader may define some synthetic orders to expire on a predetermined date or at a predetermined time during a trading day. In such an embodiment, to prevent submission of orders that have expired, the SOM 110 may periodically check for expired orders and delete those orders from its memory unit and the data store entity 114. If the SOM 110 does not have expiration information related to the orders, the SOM 110 may query the data store entity 114 and pull the information related to each order from the data store entity 114. Based on the received information, the SOM 110 may first determine if the retrieved order is a timed order, a good till date order, or a good till day order, for instance. If the retrieved order is not a timed order, the SOM 110 may retrieve the next order and perform the same check. If the SOM 110 determines that the retrieved order is any of the orders defined above or some other timed order, the SOM 110 may determine if the order submission date, order's date, or the order's expiration date was set to an earlier date than the current date. If so, the order has expired, and the SOM 110 does not initiate sending of such an order to the exchange.

Further, according to one example embodiment, SOMs may use multicast as means of discovery for synthetic orders entered via another SOM so that processing of synthetic orders may be load-balanced between a plurality of SOMs, and other SOMs may seamlessly take over processing of orders when one or more SOMs fail. Each SOM may multicast information to other SOMs upon completion of any action related to a synthetic order so that all SOMs are synchronized and have up to date information related to a specific set of orders. For example, a plurality of SOMs may be configured to listen for multicasts from each other. Further, each SOM may be configured with network addresses of other SOMs from which it may request information related to a specific set of orders.

Further, it should be understood that the SOM may be configured with a plurality of SOM groups to which it should send multicast updates, and each SOM group may be associated with a predetermined set of orders. Alternatively, a multicast message may be sent to all SOMs regardless of whether each SOM will receive order updates related to orders that are managed at the SOM sending the multicast. Those skilled in the art will understand that many other embodiments are possible as well. Further, to prevent failure due to not received multicast information, each SOM may periodically query the data store entity 110 to obtain updates on synthetic orders entered via other SOMs.

Further, the multicast may be used to provide information regarding synthetic orders entered via another gateway. In such an embodiment, for example, each SOM associated with a set of gateways may monitor triggers associated with all orders submitted via the gateways belonging to a predetermined multicast group. However, as explained in reference to the preceding figures, only the SOM that will access the data store entity 114 first, will be able to submit the order to the exchange. It should be understood that multicast is only one method of inter-process communications, and different methods could also be used, including TCIP, or HTML, for example.

Further, if the SOM 110 loses connectivity to the data store entity 114, the SOM 110 may be configured to put all synthetic orders on hold, e.g., stop monitoring triggers associated with the synthetic orders. Additionally, before putting the orders on hold, the SOM 110 may send a multicast to other SOMs including a query to verify if other SOMs have access to the data store entity 114. If no response is received during a predetermined period of time, the SOM 110 may put all synthetic orders on hold. Once the availability of the data store entity 114 is restored, the SOM 110 may reactivate the orders that have been put on hold. Also, upon reactivating the synthetic orders, the SOM 110 may verify if the status of each order has not changed. To do that, the SOM 110 may query the data store entity 114 to compare the status information. For instance, if more than one SOM 110 is capable of submitting the same set of synthetic orders, some orders might have been already submitted by another SOM upon detecting triggers associated with those orders. In such an embodiment, the SOM 110 may remove triggers associated with such orders from its list of triggers.

Linking and Managing Linked Orders

A trader may link any two orders to create a linked order such as an OCO. A typical OCO known in the art is an order consisting of two orders, such as a stop order and a limit order, that are submitted to the same exchange for the same tradable object and for the same order quantities. Once one of the levels is reached and one half of the OCO (either stop or the limit) is filled, the remaining order (either limit or the stop) associated with the OCO order is cancelled. This type of order could be fully or partially filled when the market first moves to either the stop level or the limit level, which causes the other part of the order to be cancelled.

According to an example embodiment, a trader may link any two orders to generate a linked order set. It should be understood that any method or means could be used to enable a user to link any two or more orders. For example, a graphical selection input could be displayed via the trading interface enabling a trader to link any number of orders being input by the trader. In such an embodiment, when the graphical selection input is enabled, e.g., a user selects the graphical selection input, any new orders being placed by a trader may be linked. Similarly, a trader may at any time disable linking of the orders by deselecting the graphical selection input. According to a preferred embodiment, a trader may dynamically modify one or more order parameters in each order by modifying a single order in the linked order set. For example, the SOM 110 may delete all orders that have been linked upon detecting a user input deleting one of the linked orders. It should be understood that another graphical interface could be displayed to a trader, via which a trader may specify which order parameters should be dynamically changed in all linked orders, for example.

Order parameters that can be dynamically updated in a linked order set may include, among other parameters, an order quantity, or an order price level, for example. In such an embodiment, a change in the order quantity of one of the linked orders may dynamically affect order quantities of other orders that have been linked to form a linked order set. For example, if a trader decreases/increases an order quantity in one of the linked orders, the order quantities of the other linked orders may be dynamically decreased/increased accordingly. In an embodiment in which order quantities of the linked orders are the same, the quantities of the linked orders may be dynamically decreased/increased by the same order quantity. Alternatively, if order quantities of the linked orders are different, and a quantity of one of the orders is changed, the change in the order quantities of the other orders may be proportional to the quantity change in the order that has been modified.

Similarly, instead of changing order quantities, a change in a price level of one of the orders may affect price levels of other orders that have been linked. For example, if a trader moves one of the linked orders two ticks down, price levels of other orders that have been linked may be dynamically decreased by the equivalent tick level. For example, if the linked orders are associated with the same tradable object, the other linked orders may be moved two ticks down as well. Alternatively, if a linked order set includes orders associated with different tradable objects being traded using different price tick scales, the SOM 110 may determine a new price level for each linked order relative to the price level of the order that has been repositioned to the new price level. Further, alternatively, and as mentioned in earlier paragraphs, deletion of one of the linked orders in a linked order set may cause the SOM 110 to delete all other linked orders. It should be understood that different embodiments are possible as well. For example, only some of the linked orders, the number of which may be user configurable, may be deleted upon detecting a deletion of one of the orders. The following flow chart illustrates one example method that may be performed by the SOM 110 to manage OCOs according to one embodiment.

Further, according to preferred embodiments, a trader is not limited to linking two orders as an OCO, where each order is associated with the same tradable object and the same order quantity. According to an example embodiment, a trader may link any two orders to generate a linked order set that is controlled as OCO. However, unlike the prior art system, the two linked orders may include any user configurable order types, and may be associated with different tradable objects or different order quantities. If two orders are linked as an OCO and are associated with different order quantities, the SOM may first determine an order quantity ratio, based on which it may then cancel appropriate order quantities for one of the orders based on the filled quantities received for the other linked order. For example, if the quantity ratio of the two linked orders is 2:1, and the SOM receives an update that a quantity of 4 has been filled for the first order, the SOM, based on the ratio, may cancel/delete the quantity of 2 for the second order. The Figures presented hereinafter describe embodiments where the orders are submitted to two different exchanges, however, it should be understood, and as mentioned hereinbefore, any two linked orders, such as an OCO having different order quantities set for each order, or being associated with different tradable objects may be submitted to the same exchange.

Figure 7:
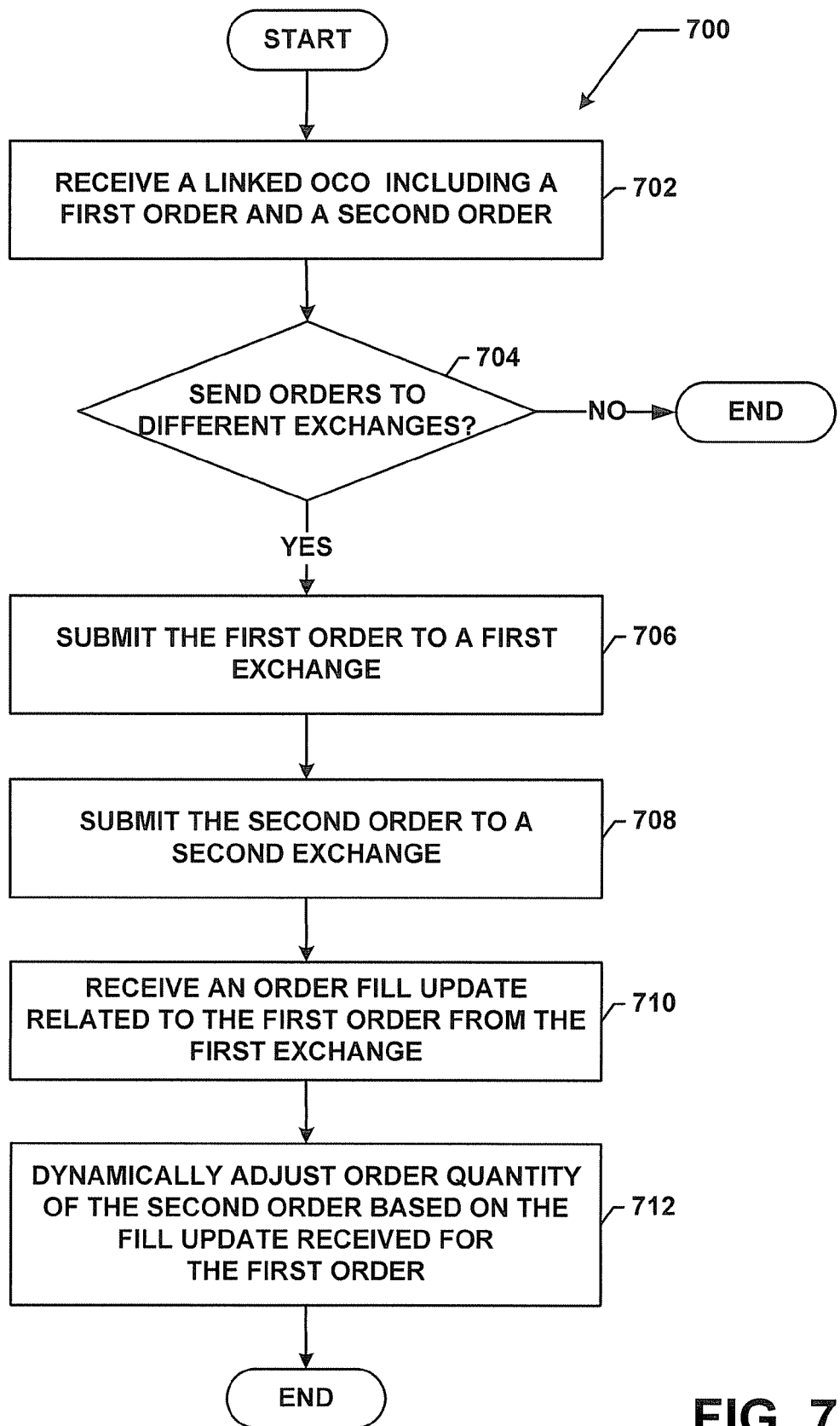
FIG. 7 is a flow chart illustrating a method for processing and managing two linked orders, forming an OCO pair, that are submitted to two exchanges according to one embodiment.

FIG. 7 is a flow chart illustrating a method 700 for linking two orders as an OCO order and managing order quantities of the two orders upon submission of each half of the OCO to a different exchange. According to an example embodiment, the SOM 110 may perform the method 700; however, different embodiments are possible as well. The example method 700 includes receiving a linked OCO including a first order and a second order at step 702, determining if two orders are to be sent to different exchanges at step 704, and if so, submitting the first order to a first exchange at step 706, and submitting the second order to a second exchange at step 708. The method 700 further includes receiving an order fill update related to the first order from the first exchange at step 710, and at step 712 dynamically adjusting order quantity associated with the second order based on the fill update related to the first order and received from the first exchange at step 710.

At step 702, the SOM 110 receives a linked OCO request including a first order and a second order. According to one embodiment, a trader may enter an OCO via a graphical interface enabling the trader to enter and link any two orders and define them as an OCO order pair. It should be understood that each half order of the OCO may be associated with the same or different tradable object being traded at different exchanges, and may include any order type such as a stop, limit or any other user defined order types. Further, it should be understood that a trader may control when an OCO is entered on the market. For example, a trader may specify a predetermined time when the OCO should be entered into the market. Alternatively, a trader may specify a certain condition, such as receiving a fill update related to another order, that may trigger submission of the OCO to the market, the embodiment of which will be described in greater detail below.

If the SOM 110 determines that the OCO is to be submitted to one exchange, and the exchange supports OCOs, the method 700 for submitting two orders to two different exchanges terminates, and the OCO entered by a trader is sent to the exchange. It should be understood that if two linked orders being part of the OCO are associated with different tradable objects, the SOM 110 may monitor fill updates for these orders, and update order quantity of the orders alternatively. If the initial order quantities are different, the SOM 110 may use the quantity number received in the update and the original ratio to determine the quantity to be cancelled in the second linked order. It should be understood that in an alternative embodiment, if a submission of the OCO is to be triggered by one or more triggering events, the SOM 110 may keep processing the order as explained in reference to the preceding figures. For example, the SOM 110 may monitor triggers associated with the OCO, and upon detecting the triggers, the SOM 110 may send the order to the exchange.

Referring back to FIG. 7, if the SOM 110 determines that the orders associated with the OCO are to be sent to two different exchanges, the SOM 110 may mark the orders with one or more predetermined identifiers indicating that the orders are linked as an OCO. Using such a method, the SOM 110 can easily detect and extract from data feeds being received from one or more exchanges data related to the linked orders. Next, at step 706, the first order may be sent to a first exchange and, at step 708, the second order may be sent to a second exchange.

At step 710, the SOM 110 receives a fill update related to the first order from the first exchange. For example, the fill update may include information related to a partial fill associated with the first order. Responsively to receiving the fill update, at step 712, the SOM 110 may adjust the order quantity of the second order based on the received fill update information. According to an example embodiment, adjusting the order quantity of the second order associated with the OCO may include canceling order quantity of the second order based on the received fill information. For example, if the first order is partially filled, and the two orders forming the OCO have the same order quantities, then the cancelled order quantity is equal to the order quantity that has been filled. Alternatively, if the order quantities associated with the two orders had different quantities, the cancelled order quantity could be determined by first determining a percentage change in the order quantity associated with the first order and then, based on the percentage change, the SOM 110 could determine the quantity to be cancelled for the second order. For example, if 50% of the order quantity associated with the first order is filled, the SOM 110 may cancel 50% of the order quantity associated with the second order. It should be understood that if the SOM 110 receives fill information related to the second order, the SOM 110 may apply the same method to cancel the order quantity associated with the first order.

Further, alternatively, and as mentioned earlier, a trader may define a ratio for an OCO order set based on which the quantities of the two half orders associated with the OCO may be determined. For example, a trader may set up a ratio such as a 2:1 ratio so that the quantity of one half of the OCO, such as the quantity of a stop order, is twice as high as the quantity of a limit order. If such a ratio is set by a trader and, once the SOM 110 detects that the quantity associated with one half of the OCO has been partially filled, the SOM 110 may determine a quantity to be canceled in the second half order based on the predefined, ratio, For example, if an order quantity ratio for an OCO is set to 2:1, where 2 corresponds to a limit order and 1 corresponds to a stop order, then the quantities of the submitted limit and stop orders may be 20 and 10, respectively. In such an embodiment, if then the quantity of 2 associated with the limit order is filled, the SOM 110 may cancel a quantity of 1 of the stop order based on the predefined order quantity ratio. It should be understood that if a predetermined order quantity is filled for one half of an OCO and, based on a predefined ratio, the quantity to be cancelled for the second half of the OCO does not correspond to an integer, a rounding algorithm may be used to determine the quantity to be cancelled in the second half of the OCO. Alternatively, no quantity of the second half of the OCO is canceled until an integer quantity can be cancelled, e.g., until a higher quantity of the first half order is filled. It should be understood that many different rules and algorithms may be configured to determine order quantities if, based on the preset ratio, an order quantity to be cancelled is not an integer.

Further, it should be understood that in an alternative embodiment, a trader may link an OCO to a third order, and any fill received for the third order may trigger submission of the OCO to the market. The following flow chart illustrates an example method that may be performed by the SOM 110 to manage conditional OCOs according to one embodiment.

Figure 8A:
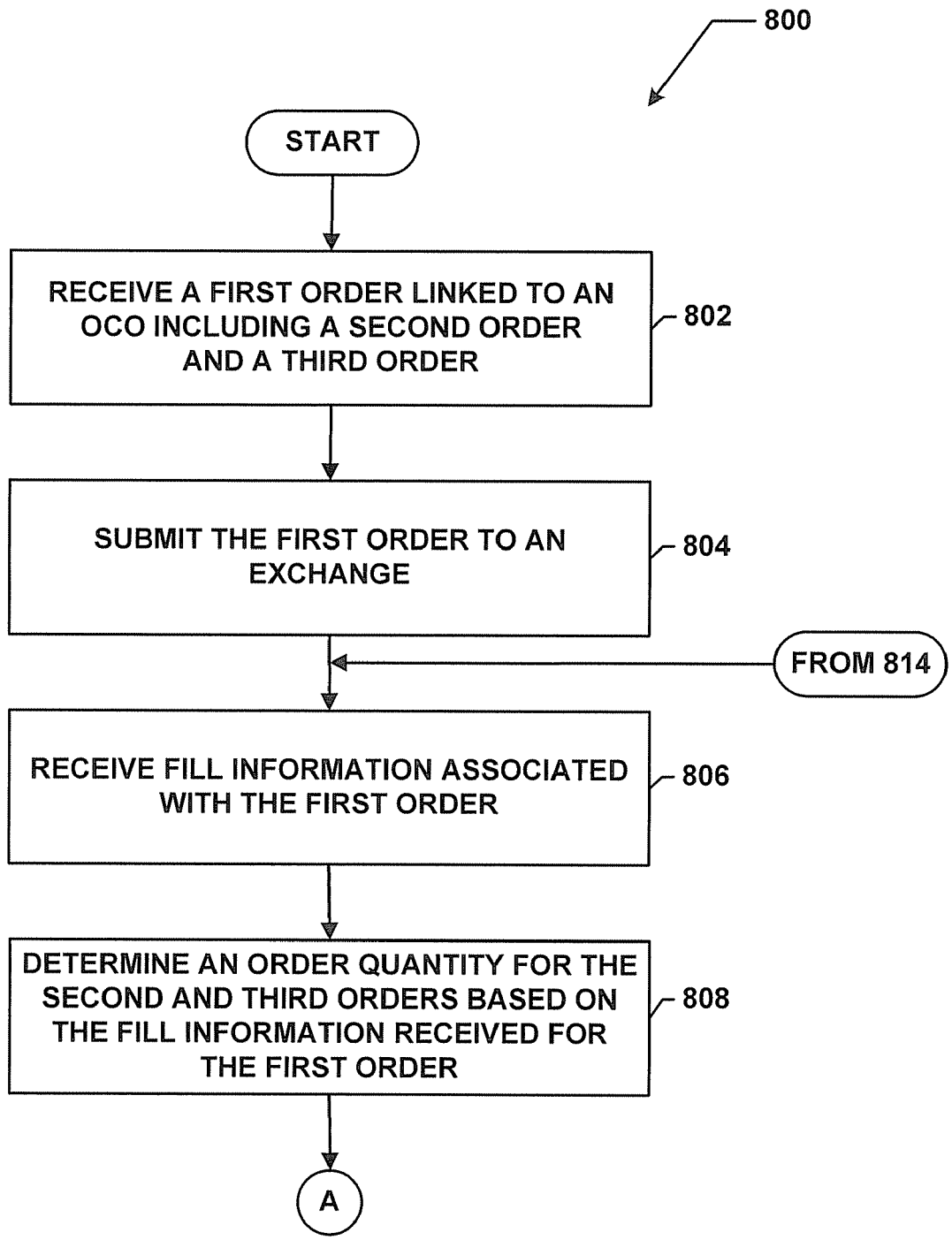
FIGS. 8A and 8B are a flow chart illustrating a method for linking more than two orders and conditional submission of the order to one or more exchanges according to one embodiment.
Figure 8B:
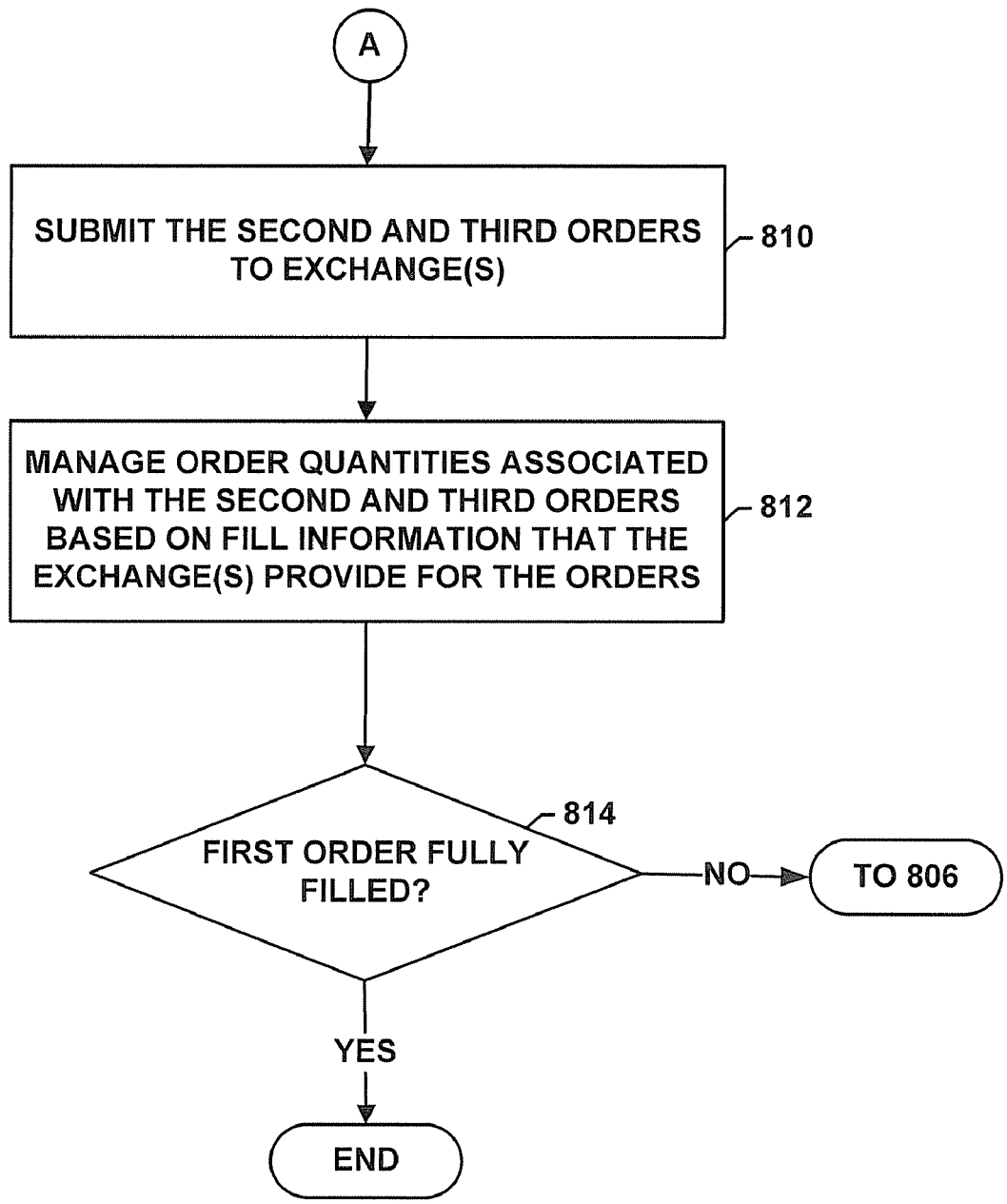

FIGS. 8A and 8B are a flow chart illustrating a method 800 for linking more than two orders and conditional submission of the orders to an exchange according to one embodiment. According to the example method 800, an OCO is part of a conditional order set, and the orders associated with the OCO are submitted to one or more exchanges upon receiving fill information related to another order linked to the OCO. In one embodiment, the SOM 110 may perform the method 800; however, different embodiments are possible as well. The example method 800 includes receiving a first order linked to an OCO associated with a second order and a third order at step 802, submitting the first order to an exchange at step 804, receiving fill information associated with the first order at step 806, determining order quantity for the second and third orders based on the fill information received for the first order at step 808, submitting the second and third orders to the same or different exchanges at step 810, managing order quantities associated with the second and third orders at step 812, determining if the first order has been fully filled at step 814, if the order has not been fully filled, continuing the method 800 at step 806, and if it is, terminating the method 800.

At step 802, the SOM 110 receives a first order linked to an OCO including a second order and a third order. According to an example embodiment, the OCO is a conditional order and may be submitted to one or more exchanges upon determining that the first order has been partially or fully filled. It should be understood that a trader may input and link an OCO with the first order using many different means including a graphical interface enabling the trader to input OCOs and to link any two or more orders to create a linked order set, for example. Further it should be understood that the OCO may be associated with any two linked orders associated with the same or different trading quantities and tradable objects, that may be submitted to the same or different exchanges.

At step 804, the first order is submitted to an exchange. Responsively, the SOM 110 may start monitoring data feeds being received from the exchange in order to detect fill information related to the first order. At step 806, the SOM 110 receives fill information related to the first order, responsively to which the SOM 110 may submit the linked OCO to one or more exchanges. Before submitting the second and third orders associated with the OCO to one or more exchanges, at step 808, the SOM 110 may determine order quantities for these orders. For example, in one embodiment, the order quantities for the linked orders may be equal to the filled order quantity associated with the first order. In such an embodiment, if the SOM 110 detects that the quantity of three has been filled for the first order, the order quantities for the second and third orders may be set to three as well. However, it should be understood that different embodiments are possible as well. For example, order quantities associated with the OCO may be different than the filled order quantity. Further, in one embodiment, the first order may be associated with an order to buy, while the OCO orders may be associated with orders to sell, including one stop and one limit sell order, for example.

Upon determining order quantities for the linked orders based on the fill quantity of the first order, at step 810, the second and third orders are submitted to one or more exchanges. At step 812, the SOM 110 may monitor fills associated with the second and third orders and update the order quantities according to the methods described above. As explained in reference to FIG. 7, if the orders are submitted to two different exchanges, the SOM 110 may monitor fill information related to the orders based on information provided in data feeds from the two exchanges. Further, since the second and third orders are linked as an OCO, when the SOM 110 receives fill information related to one of the orders, it will automatically decrease the order quantity of the other linked order. If the order quantities of the OCO orders are the same, the order quantity that is cancelled may be equal to the order quantity that has been filled.

At step 814, the SOM 110 determines if the first order has been fully filled. If so, the method 800 terminates. Otherwise, the method continues at step 806, where the SOM 110 may receive additional fill-related information associated with the first order and responsively may submit more OCO order pairs until the full order quantity associated with the first order is filled.

In one embodiment, each order entered by a trader may trigger activation of an OCO including a limit order and a stop order that are entered on the market for every fill quantity detected for the order. Further, a trader may configure a tick value or a price difference between the price level of the filled order, and a limit and stop linked order pair. Thus, when the SOM 110 detects a fill for the order that has been sent to the exchange, and the order is linked to an OCO, the SOM 110 may then dynamically enter two orders corresponding to the OCO at the price levels preconfigured by a trader. For example, a trader may enter a buy order at 33.50, and then may configure an OCO including a sell stop to be entered 6 ticks lower than the buy level, thus, stopping loss at 30.50, and a sell limit at 6 ticks higher from the buy level, thus, booking profit at 36.50. In such an embodiment, for every fill detected for the buy order at 33.50, the SOM 110 may automatically enter a sell stop order at 30.50 and a sell limit order at 36.50. It should be understood that the quantities corresponding to the sell stop and sell limit orders may match the quantity of the filled buy order. For example, if the SOM 110 detects a fill for 2 corresponding to the buy order at 33.50, a stop order to sell 2 at 30.50, and a limit order to sell 2 at 36.50 may be sent to the exchange. Similarly, if a trader sends a sell order to an exchange, an OCO including a stop buy and a limit buy may be linked to the sell order. However, it should be understood that a trader may control order quantities that should be sent for each order, and the order quantities may be different.

Further, in addition to presetting price levels for the linked orders, such as an OCO that is linked to another order, the SOM 110, or any other application, such as a trading application, may monitor market movement and update price levels of each half of the OCO based on the market movement. For example, a trader may configure a set of rules defining price level updates for each linked OCO that may occur upon detecting a predetermined market movement trend. The trader-configured rules may define conditions defining market movement trends that cause linked orders, such as two orders linked as an OCO, to be moved to new price levels. For example, upon detecting a downward market trend, a trader-configured rule may keep the two orders associated with the OCO at the same price level. Alternatively, upon detecting an upward market trend, price levels of the linked orders may be updated to higher levels accordingly. In one embodiment, a trader may define a conditional update of price levels based on market movements. For example, the SOM 110 may monitor the inside market and allow the inside market to move a preset number of ticks up before updating the price level of the linked orders so that small market fluctuations don't cause the price levels to be updated continuously. Further, alternatively, only a stop order or a limit order associated with the linked order cancel order pair may be moved based on the market movement, while the other order may stay at the same level.

The method for moving orders described above may be beneficial to a trader when the market suddenly shifts, causing one of the orders to be filled when a sudden shift occurs before the orders get moved. However, instead of changing the order prices based on the market movements and updating the order prices based on a bi-directional market movement, the movement of the orders may be unidirectional and may be based on whether an OCO is a sell order set or a buy order set that is submitted upon receiving a fill on a buy or a sell, respectively. For example, if a sell order gets filled at the 100-price level, the SOM 110 may automatically enter an OCO buy order pair including a buy stop order at 103 and a buy limit order at 97. In such an embodiment, the SOM 110 may be configured to move the OCO order pair upon detecting a downward market trend thus booking the highest profit possible. Using such a method, if the market moves two ticks down, the two linked orders may be moved to price levels of 101 and 95, respectively. If the market then moves additional 6 ticks down, the orders may be moved to price levels of 95 and 89, respectively. In such an embodiment, if the market direction changes, and the market moves up, the order at the 95 price level will get filled. Thus, such an embodiment is especially beneficial when a trader wants to lock his/her winning or maximize profit. It should be understood that when a trader starts with a buy order, the fill of which triggers a sell OCO order pair, the upward market movement may trigger the OCO sell order pair to follow the upward market trend, thus, once again locking the trader's profit.

Further, alternatively, a trader may define a set of rules that may change a price level of an order when the order is partially filled. In such an embodiment, a trader may define a set of rules so that when a predetermined portion, e.g., a percentage of the original order quantity, is filled, the remaining order quantity at the original price level may be cancelled, and a new order at a price level different from the original price level may be added to the market. For example, a new price level may be set to a price level that is further away or closer from/to the market level than the original price level associated with the order. For example, a trader may define a number of ticks from the inside market that may be used at the SOM 110 to determine a new price level. Alternatively, the new price level may be based on the market trend. Further, it should be understood that a trader may control an order quantity of a new order that is placed on the market when the partial fill of the original order is detected. For example, the order quantity for the new order may be set to the order quantity of the original order. Alternatively, the order quantity for the new order may be set to the remaining order quantity of the partially filled order.

Further, according to another embodiment, a trader may link two or more orders so that a change in one of the linked orders may be dynamically reflected in one or more other linked orders. It should be understood that a trader may change one of the order parameters in one of the linked orders that may then trigger the SOM 110 to automatically reflect the change in other linked orders. For example, when a trader links two or more orders, and the SOM 110 detects a change in an order quantity of one of the linked orders, such as upon receiving a user input decreasing or increasing the order quantity, the SOM 110 may automatically modify order quantities in other linked orders accordingly. Based on the discussion above, it should be understood that the linked orders may be associated with the same or different tradable objects, order types, order quantities, or exchanges to which the orders have been submitted. Further, for example, a trader may delete one of the linked orders that, when detected by the SOM 110, may cause a deletion of other linked orders. Additionally, a trader may decide to change a price level of one of the linked orders, that may in turn cause the movement of other linked orders to new price levels. For example, if a trader moves one of the linked orders two ticks up, the SOM 110, upon detecting a change, may move other linked orders two ticks up as well. Therefore, using the example methods, instead of changing order parameters for many orders individually, a trader may rather link two or more orders, and the change in one of such orders may be dynamically reflected in other linked orders, thus, saving valuable time and allowing a trader to concentrate on making other trades.

It should be understood that the above description of the preferred embodiments, alternative embodiments, and specific examples, are given by way of illustration only and should not be viewed as limiting. Further, many changes and modifications within the scope of the present embodiments may be made without departing from the spirit thereof, and the present invention includes such changes and modifications.

Further, it will be apparent to those of ordinary skill in the art that methods involved in the system and methods for linking and managing linked orders in an electronic trading environment may be embodied in a computer program product that includes one or more computer readable media. For example, a computer readable medium can include a readable memory device, such as a hard drive device, a CD-ROM, a DVD-ROM, or a computer diskette, having computer readable program code segments stored thereon. The computer readable medium can also include a communications or transmission medium, such as, a bus or a communication link, either optical, wired or wireless having program code segments carried thereon as digital or analog data signals.

The claims should not be read as limited to the described order or elements unless stated to that effect. Therefore, all embodiments that come within the scope and spirit of the following claims and equivalents thereto are claimed as the invention.

What is claimed is:

1. A method for managing orders in an electronic trading environment, the method comprising:
   receiving an order request via an input device associated with a client computing device to submit a first order for a first quantity of a first tradeable object at a first price from the client computing device to a first electronic exchange;
   in response to receiving the order request:
      (i) submitting the first order from the client computing device to the first electronic exchange for the first quantity of the first tradeable object,
      (ii) determining a second price of a second order for a second tradeable object according to the first price and a predetermined relationship between the first tradeable object and the second tradeable object, and
      (iii) submitting the second order from the client computing device to a second electronic exchange for a second quantity of the second tradeable object at the second price, the second order being submitted from the client computing device substantially simultaneously as the first order, where, at a first time subsequent to both the first order and the second order being submitted, the first order is executable by the first electronic exchange and the second order is executable by the second electronic exchange;
   receiving, at the client computing device at the first time, an electronic market data transmission from the first electronic exchange, the electronic market data transmission including a first updated order parameter for the first order; and
   in response to receiving the electronic market data transmission, submitting an update message via the client computing device to the second electronic exchange to update the second order executable by the second electronic exchange with a second updated order parameter determined according to the predetermined relationship and the first updated order parameter.

2. The method of claim 1, where submitting the update message to the second electronic exchange further comprises cancelling the second order.

3. The method of claim 2, where submitting the update message to the second electronic exchange further comprises submitting a new second order to trade an updated second quantity of the second tradeable object determined according to the predetermined relationship.

4. The method of claim 1, further comprising:
   receiving via the input device a user command to change the first quantity; and
   in response to receiving the user command, submitting a change message to the second electronic exchange to change the second quantity of the second order executable by the second electronic exchange to a changed second quantity determined according to the predetermined relationship.

5. The method of claim 4, where submitting a change message to the second electronic exchange further comprises:
   cancelling the second order executable by the second electronic exchange; and
   submitting a new second order to trade the changed second quantity of the second tradeable object determined according to the predetermined relationship.

6. The method of claim 1, further comprising:
   receiving via the input device a user command to change the first price;
   in response to receiving the user command, submitting a change message to the second electronic exchange to change the second quantity of the second order executable by the second electronic exchange to a changed second quantity determined according to the predetermined relationship.

7. The method of claim 1, further comprising:
   receiving via the input device a user command to change the first price; and
   in response to receiving the user command, submitting a change message to the second electronic exchange to change the second price of the second order executable by the second electronic exchange to a changed second price determined according to the predetermined relationship.

8. The method of claim 1, where the first updated order parameter for the first order comprises an update to the first quantity.

9. The method of claim 1, where the first updated order parameter for the first order comprises an update to the first price.

10. The method of claim 1, where together the first order and second order comprise an order cancel order.

11. The method of claim 1, where the first electronic exchange is different from the second electronic exchange.

12. The method of claim 1, further comprising:
   receiving via the input device a user command to delete the first quantity; and
   in response to receiving the user command, submitting a delete message to the second electronic exchange to delete the second order executable by the second electronic exchange.

13. The method of claim 1, further comprising:
   submitting, from the client computing device to a third electronic exchange, a third order to trade a third quantity of a third tradeable object at a third price, the submitted third order executable by a third electronic exchange; and
   detecting a predetermined condition associated with the submitted third order executable by the third electronic exchange, where submitting the first order from the client computing device to the first electronic exchange is in response to detecting the predetermined condition and receiving the order request.

14. The method of claim 13, where the predetermined condition comprises a fill update associated with the third order, and where the first quantity is determined based on a filled order quantity identified in the fill update.

15. The method of claim 1, where the predetermined relationship comprises a predetermined ratio between the first quantity and the second quantity.

16. The method of claim 1, where the first order is submitted to the first electronic exchange according to a predefined time period.

17. A computer readable medium having instructions stored thereon executable by a computing device to carry out the steps comprising:
   receiving an order request via an input device associated with a client computing device to submit a first order for a first quantity of a first tradeable object at a first price from the client computing device to a first electronic exchange;

in response to receiving the order request:
(i) submitting the first order from the client computing device to the first electronic exchange to trade the first quantity of the first tradeable object,
(ii) determining a second price of a second order for a second tradeable object according to the first price and a predetermined relationship between the first tradeable object and the second tradeable object, and
(iii) submitting the second order from the client computing device to a second electronic exchange for a second quantity of the second tradeable object at the second price, the second order being submitted from the client computing device substantially simultaneously as the first order, where, at a first time subsequent to both the first order and the second order being submitted, the first order is executable by the first electronic exchange and the second order is executable by the second electronic exchange;

receiving, at the client computing device at the first time, an electronic market data transmission from the first electronic exchange, the electronic market data transmission including a first updated order parameter for the first order; and in response to receiving the electronic market data transmission, submitting an update message to the second electronic exchange to update the second order executable by the second electronic exchange with a second updated order parameter determined according to the predetermined relationship and the first updated order parameter.

18. The computer readable medium of claim 17, where submitting the update message to the second electronic exchange further comprises:
cancelling the second order executable by the second electronic exchange; and
submitting a new second order to trade an updated second quantity of the second tradeable object determined according to the predetermined relationship.

19. The computer readable medium of claim 17, where the first updated order parameter for the first order comprises an update to the first quantity and the predetermined relationship comprises a predetermined ratio between the first quantity and the second quantity.

20. A computing device configured for electronic trading, comprising:
an order input configured to receive a command to submit a first order to trade a first quantity of a first tradeable object at a first price to a first electronic exchange;
an order transmitter configured to:
submit, from the computing device to the first electronic exchange, the first order to trade the first quantity of the first tradeable object at the first price;
determine a second price of a second order for a second tradeable object according to the first price and a predetermined relationship defining a relationship between the first tradeable object and the second tradeable object; and
submit the second order for a second quantity of the second tradeable object at the second price, the second order being submitted from the client computing device to a second electronic exchange substantially simultaneously as the first order, where, at a first time subsequent to both the first order and the second order being submitted, the first order is executable by the first electronic exchange and the second order executable by the second electronic exchange;
a receiver configured to receive, at the client computing device, an electronic market data transmission from the first electronic exchange, the electronic market data transmission including a first updated order parameter for the first order; and
an update transmitter configured to submit, in response to receiving the electronic market data transmission at the first time, an update message to the second electronic exchange to update the second order executable by the second electronic exchange with a second updated order parameter determined according to the predetermined relationship and the first updated order parameter.

21. The computing device of claim 20, where the update transmitter is further configured to submit an update message to cancel the second order and to submit a new second order to trade an updated second quantity of the second tradeable object determined according to the predetermined relationship.

22. The computing device of claim 20, where the first updated order parameter for the first order comprises an update to the first quantity, and where the predetermined relationship comprises a predetermined ratio between the first quantity and the second quantity.

* * * * *

UNITED STATES PATENT AND TRADEMARK OFFICE
CERTIFICATE OF CORRECTION

| | | |
|---|---|---|
| PATENT NO. | : 7,848,994 B1 | Page 1 of 1 |
| APPLICATION NO. | : 11/415949 | |
| DATED | : December 7, 2010 | |
| INVENTOR(S) | : Ryan N. Andrews et al. | |

It is certified that error appears in the above-identified patent and that said Letters Patent is hereby corrected as shown below:

Title Page, Item (75), Inventors: replace "Sagy P. Mitz" with --Sagy P. Mintz--

Signed and Sealed this
Eighth Day of February, 2011

David J. Kappos
*Director of the United States Patent and Trademark Office*